United States Patent [19]

Thomas, deceased et al.

[11] 3,937,567

[45] Feb. 10, 1976

[54] CONTINUOUS MOTION PICTURE PROJECTOR APPARATUS

[75] Inventors: Richard Thomas, deceased, late of Los Angeles, Calif., by Betty M. Thomas, executrix, Corona Del Mar, Calif.

[73] Assignees: Betty Thomas, Santa Ana; Helen Hansen, Long Beach, both of Calif.

[22] Filed: Mar. 29, 1974

[21] Appl. No.: 456,002

[52] U.S. Cl. .................. 352/27; 352/125; 352/198; 352/83
[51] Int. Cl.² .......................................... G03B 31/02
[58] Field of Search ....... 352/27, 37, 125, 198, 155, 352/83

[56] References Cited
UNITED STATES PATENTS

| | | | |
|---|---|---|---|
| 1,419,759 | 6/1922 | Reid | 352/155 |
| 3,476,469 | 11/1969 | Wells | 352/37 |
| 3,482,907 | 12/1969 | Michelson | 352/37 |
| 3,492,066 | 1/1970 | Michelson | 352/37 |
| 3,639,045 | 2/1972 | Haefeli | 352/37 |

*Primary Examiner*—Monroe H. Hayes
*Attorney, Agent, or Firm*—Whann & McManigal

[57] ABSTRACT

A continuous motion picture projection apparatus for use with a film strip having two side by side data tracks each comprising a photographic image track and a synchronized sound track. The first half of the program is carried by one data track and the other half by the second data track. The apparatus includes a main drive assembly which moves the film strip through the unit alternately in a forward and reverse direction and further comprises an illumination system, a projection lens system and a sound track sensor system. These systems are movable between a first position in alignment with the first data track and a second position in alignment with the second data track. Mechanisms associated with each of the systems are operably coupled with the main drive assembly and serve to automatically move the systems between their first and second positions upon reversal of the drive assembly. A reversing mechanism is provided to sense a specific location near either end of the film strip and thereupon to reverse the drive assembly. Reversal of the drive assembly reverses the direction of travel of the film strip and simultaneously causes the illumination, projection lens and sound track sensor systems to be moved into alignment with the second data track. By alternately running the film strip first in one direction and then in the other, the program can be continuously repeated.

6 Claims, 26 Drawing Figures

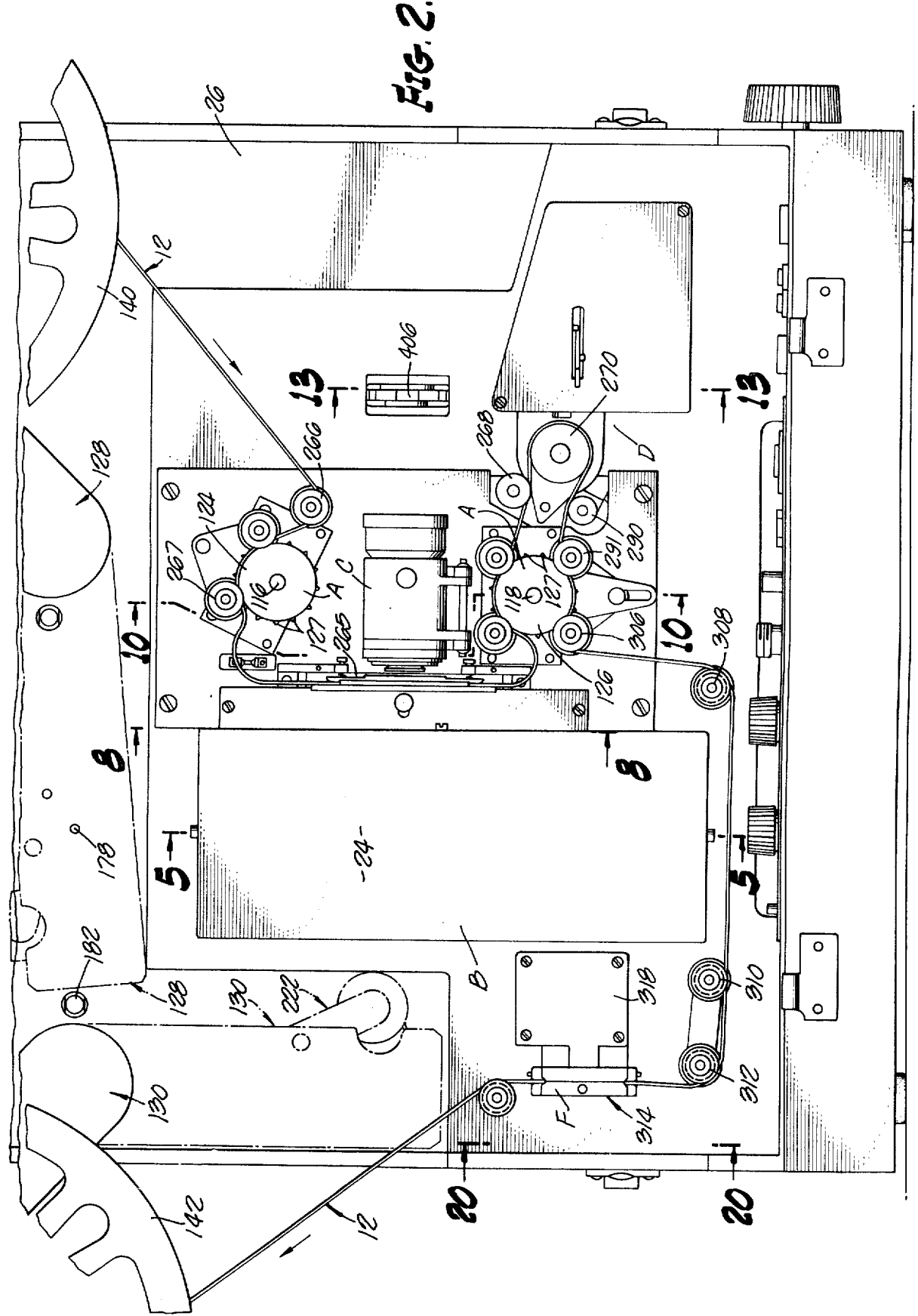

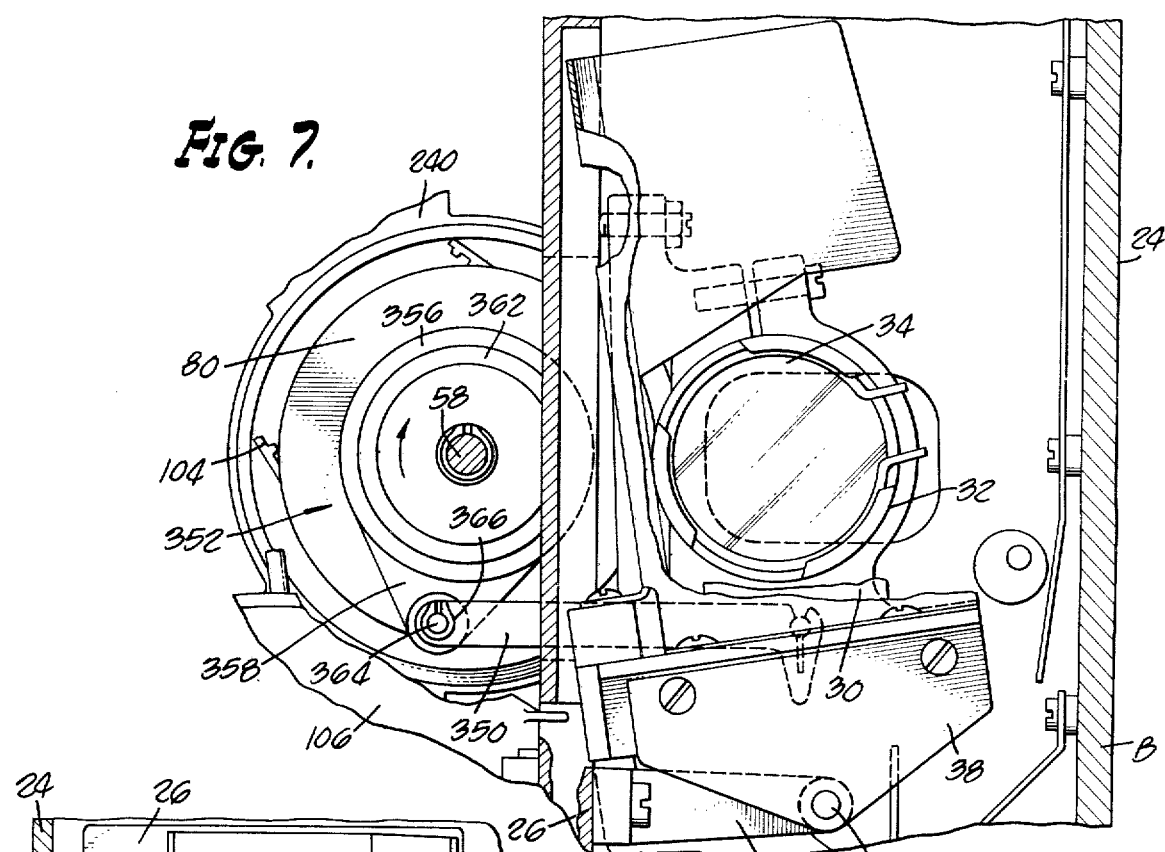
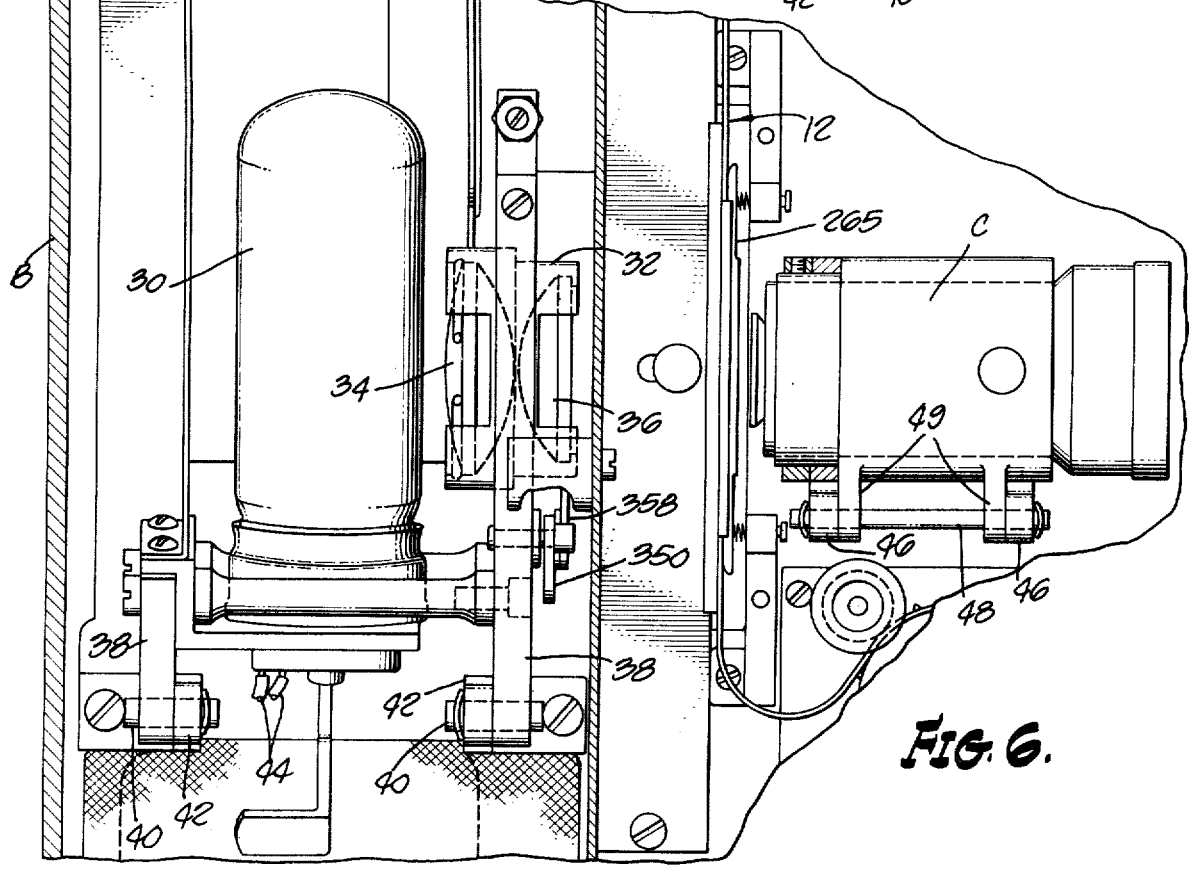

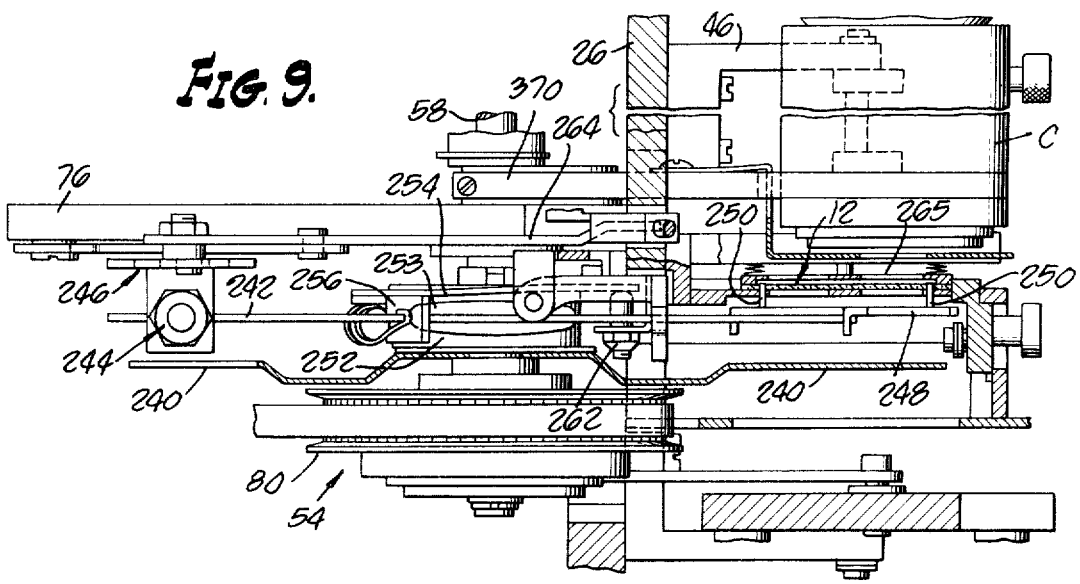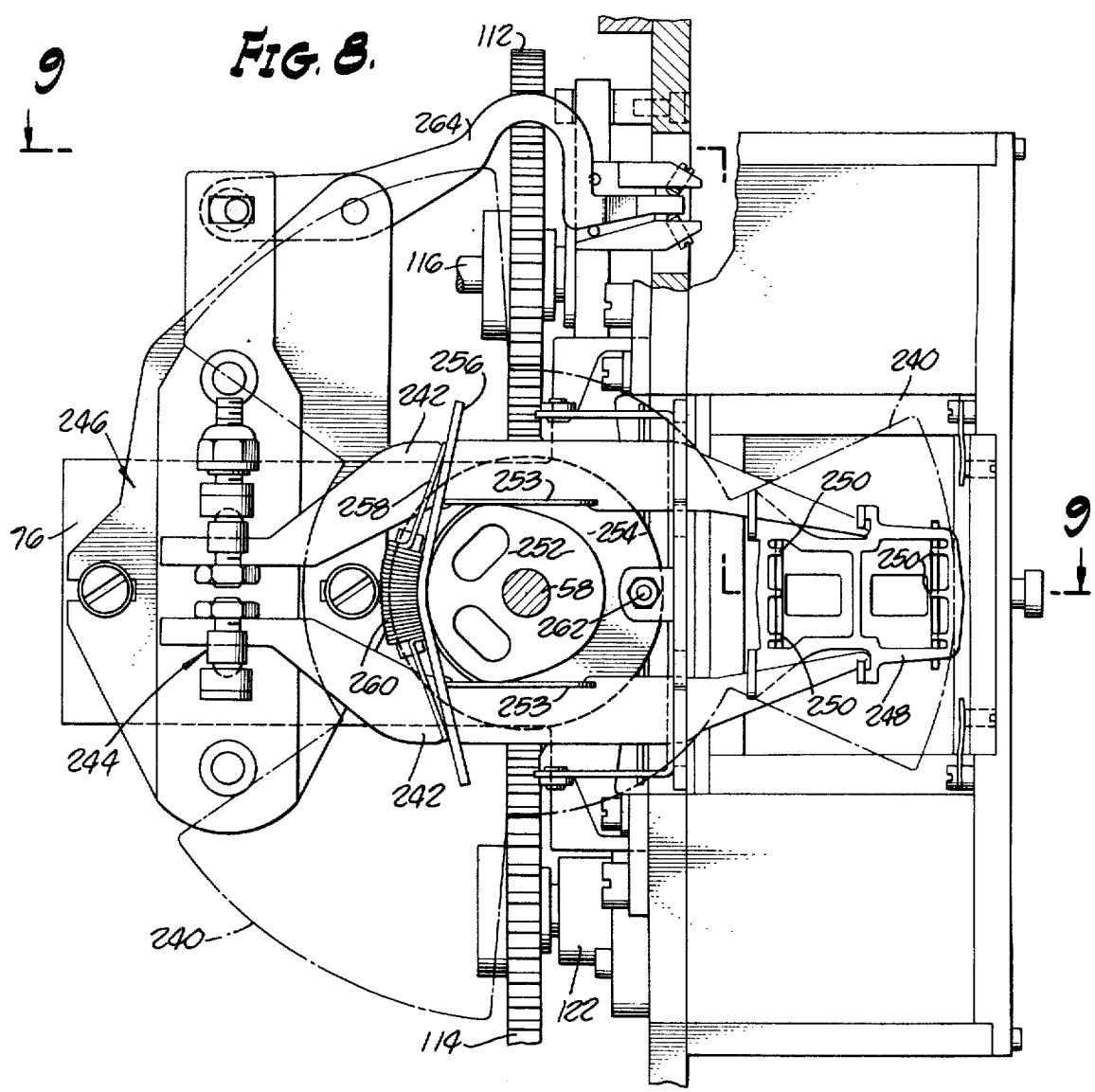

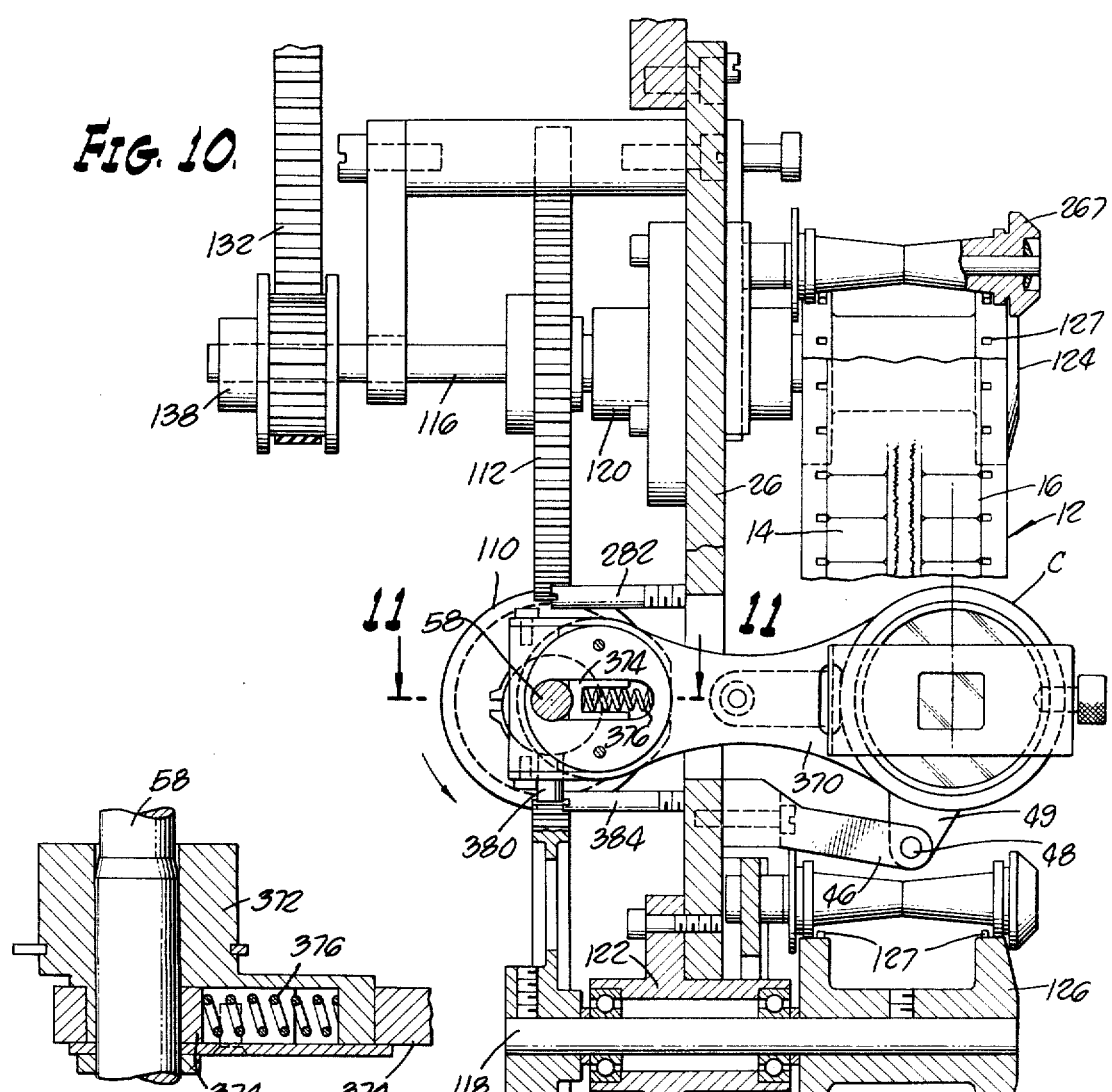
FIG. 10.
FIG. 11.
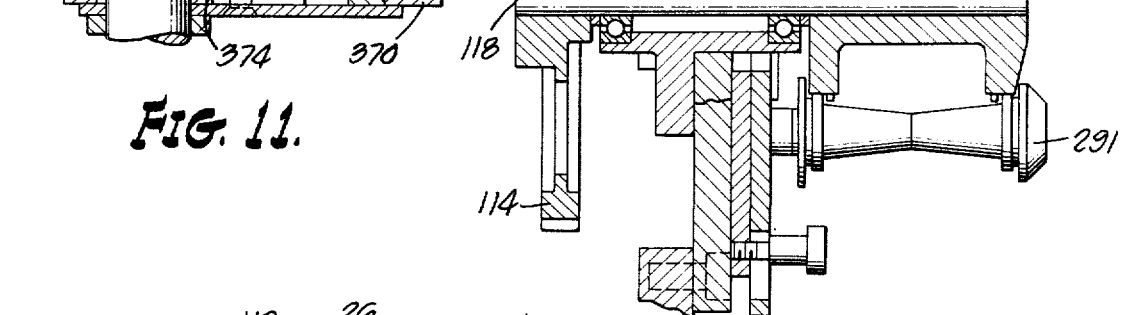
FIG. 12.
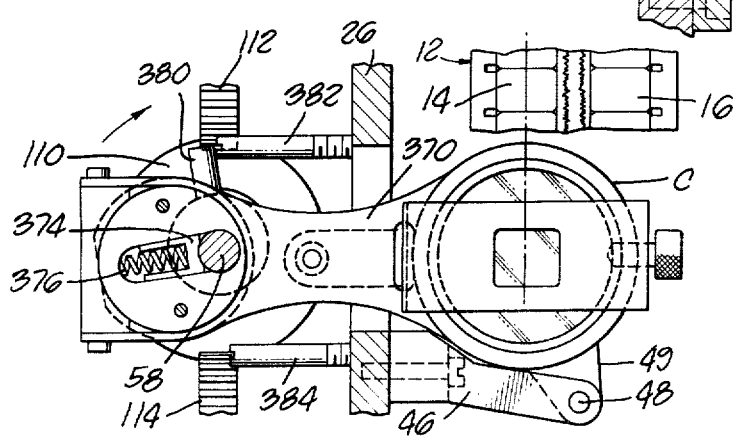

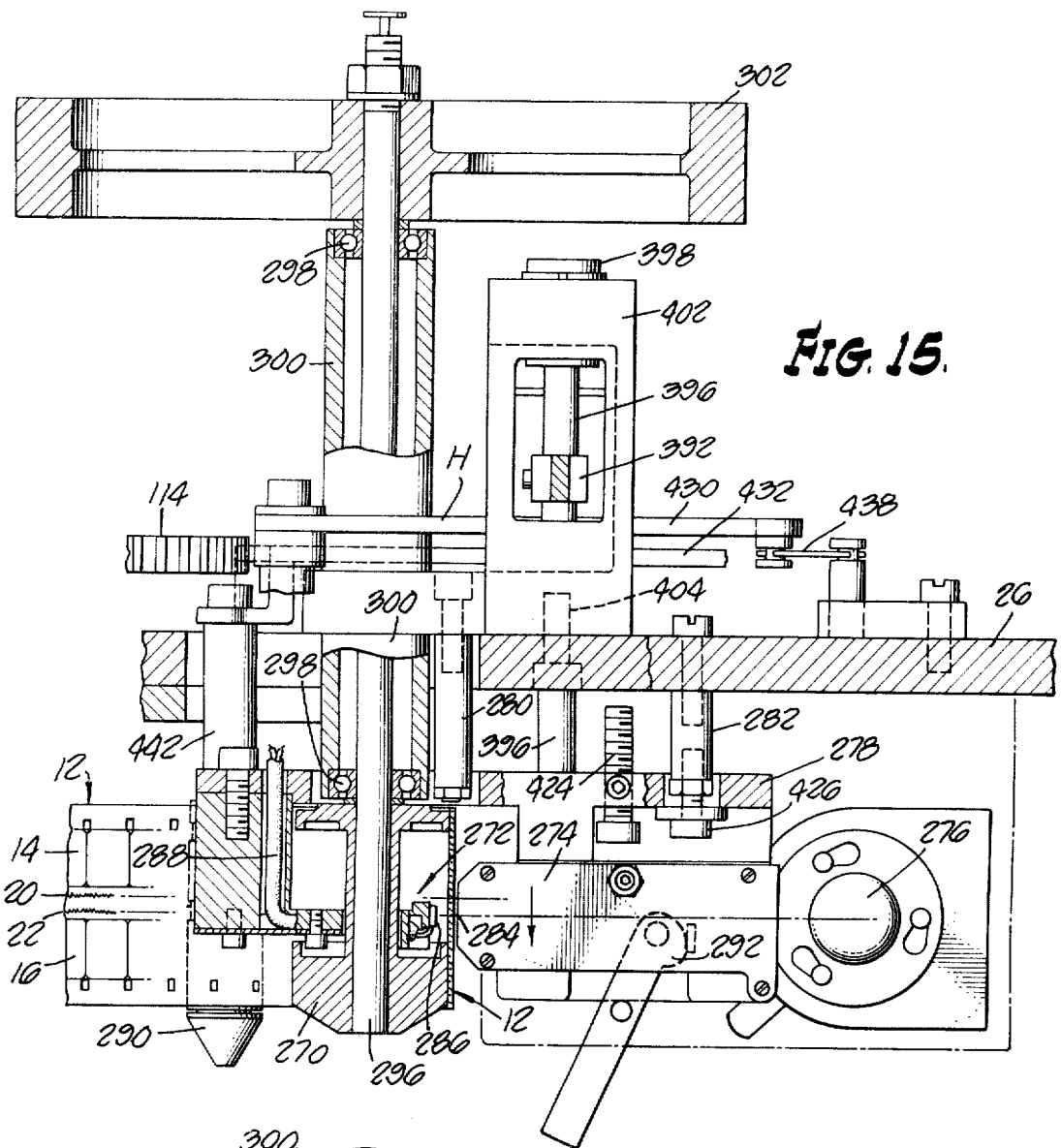
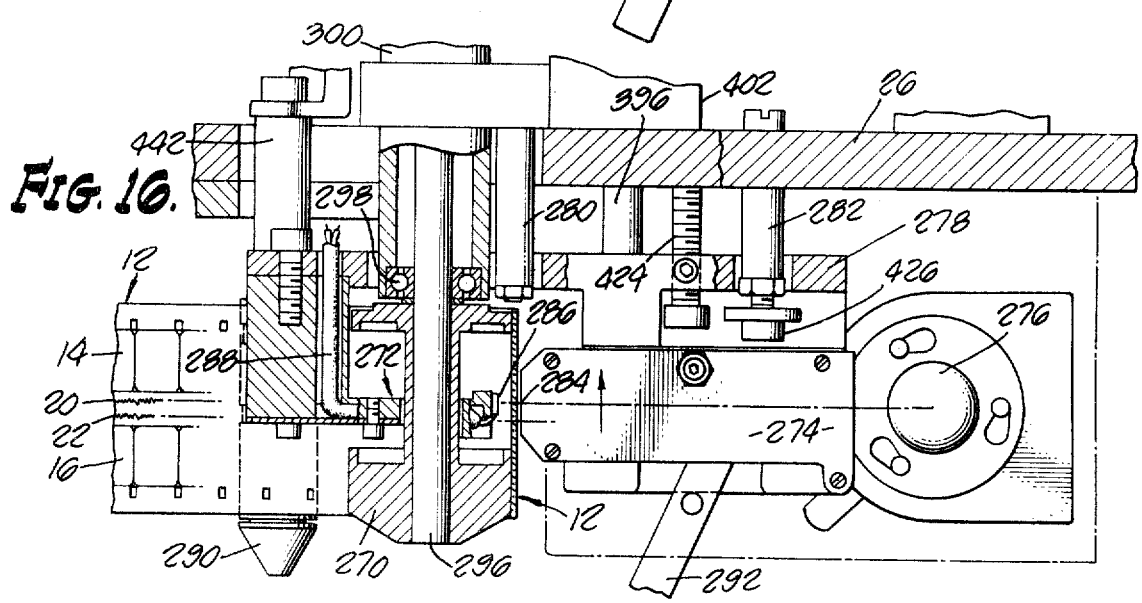

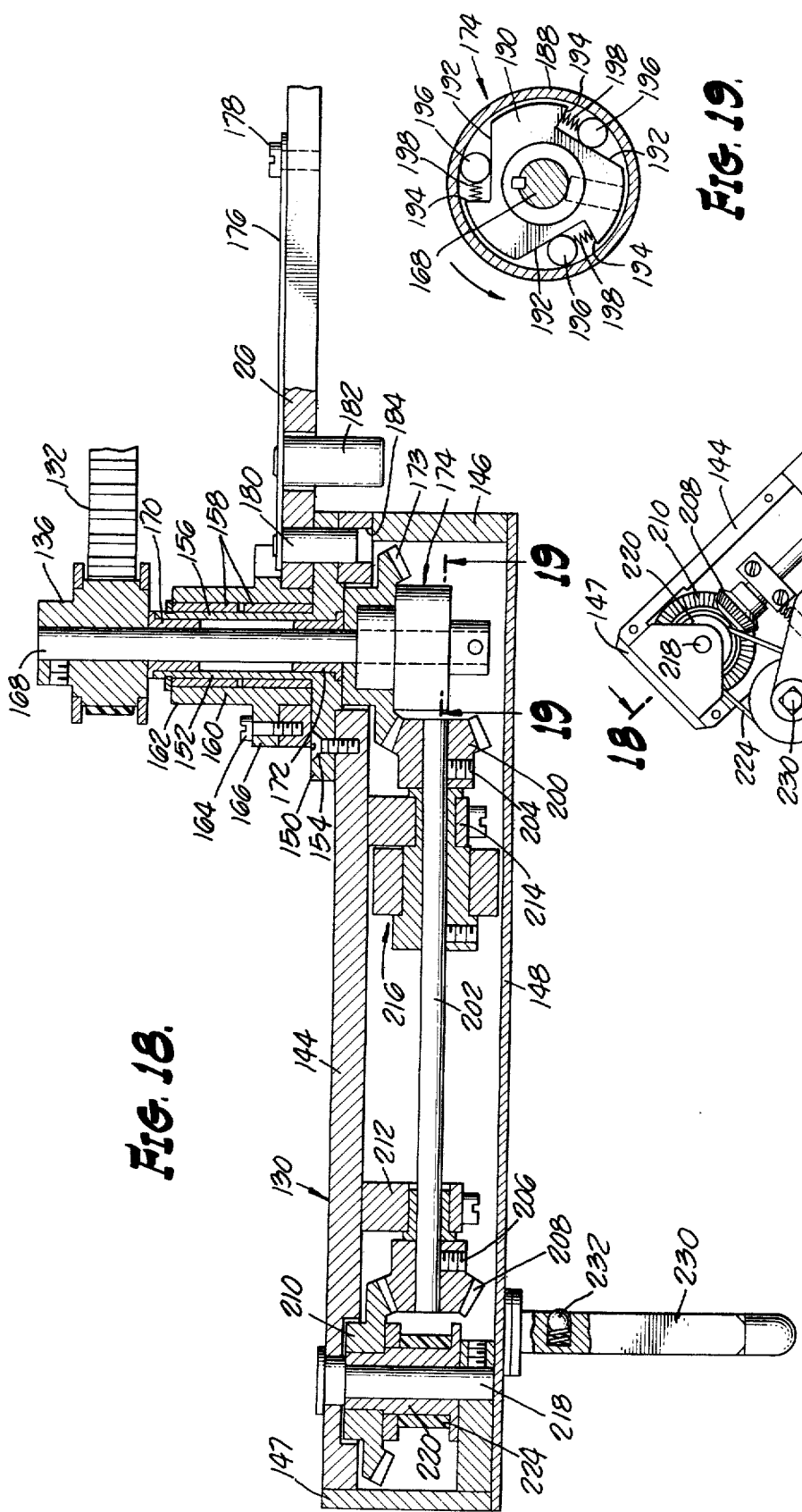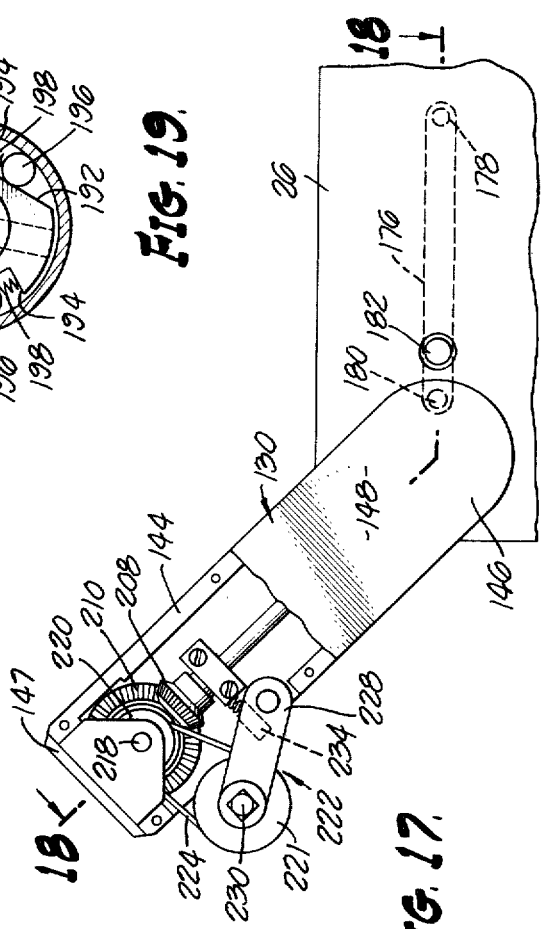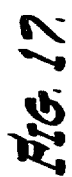

3,937,567

CONTINUOUS MOTION PICTURE PROJECTOR APPARATUS

BACKGROUND OF THE INVENTION

1. Field of the Invention

The present invention relates generally to audiovisual systems and more particularly to a novel fully automatic continuous sound motion picture projection apparatus and the film therefor.

2. Discussion of the Prior Art

Audio-visual systems are finding increased use not only in the entertainment field for feature motion pictures but also in the fields of education, advertising and business. Of particular demand in each of these fields are audio-visual systems which are completely automatic and are capable of continuously presenting an audio-visual program without the necessity of constant operator supervision. Particularly in the field of advertising there is a great need for audio-visual systems of professional quality which can be used to repeatedly present to a transient audience a program of extended duration describing, for example, the products or services of a particular company. Also, in the field of education high quality fully automatic audio-visual systems are invaluable as teaching aids.

In the past, various devices have been developed for continuous presentation of audio-visual programs. In some of these devices the data carrying means, be it film, magnetic tape, punched tape, or the like, is run through the device and then is automatically rewound for a subsequent replay. This is undesirable because of the delay in rewinding and the resulting interruption of the program. In other types of prior art apparatus, the data carrying means is formed into an endless loop and run continuously through the apparatus along a circuitous path. This approach has proven generally unsatisfactory for many applications because unless the apparatus is unduly large, data strips such as punched tapes, 16mm film, and the like, cannot withstand continuous travel along the circuitous path without damage or fatigue resulting in breakage of the data strip.

The apparatus of the present invention solves the problems inherent in the prior art devices through the use of a novel data carrying means or data strip having first and second side by side data tracks, one of which carries the first half of the program and the other of which carries the second half of the program. The apparatus includes a plurality of data sensors for sensing the data carried by the data tracks and transforming it into perceptible form, and drive means for moving the data strip past data sensors first in one direction and then in the opposite direction. At the start of the program, the sensors are aligned with one data track on the data strip. When the data strip reaches a point near its first end, the drive means is automatically reversed so as to drive the data strip in a reverse direction. Simultaneously, the sensors are automatically shifted into alignment with the second data track and as the data strip moves past them in the reverse direction function to transform the data which comprises the second half of the program into perceptible form. Upon the data strip reaching its point of beginning, the drive means is again reversed, the sensors shifted into alignment with the first data track and the program rerun from its beginning. This process will continue automatically, enabling continuous presentation of the program.

For advertising displays and the like, a timer can be used to automatically start and stop the apparatus at predetermined intervals. To prevent damage to the equipment should the data strip break, an automatic shutdown mechanism is built into the apparatus.

SUMMARY OF THE INVENTION

It is an object of the present invention to provide a novel, continuously operating data conversion device in which data susceptible of being transformed into perceptible form is photographically, magnetically, electronically or otherwise imprinted onto a data carrying element. The data is imprinted along two or more data tracks and appropriate data sensing and transforming systems to transform the data to perceptible form are provided to act first upon the data carried on a first track or combination of tracks as the data element is moved in one direction relative to the sensing systems and then upon the data carried on a second track or combination of tracks upon reversal of the direction of the data element. By arranging the program or the data element so that the first portion thereof is contained on the first track or tracks and the concluding portion is contained on the second track or tracks, the program can be run continuously by repeatedly running the data element first in a forward direction with the sensing systems acting on the first track or tracks and then in a reverse direction with the sensing system acting on the second track or tracks.

More particularly, it is an object of the invention to provide a motion picture projection apparatus in which a sound motion picture program is carried on the data carrying element and in which the program can be run continuously without the necessity of operator supervision or of stopping the projector to rewind the film.

This continuous program presentation is accomplished by imprinting on a photographic film in a side by side relationship first and second image tracks and first and second sound tracks synchronized with the image tracks. The second track continues the program imprinted on the first track with the photographic images imprinted on the second track being optically reversed from those on the first track.

By running the film strip first in one direction with the illumination, lens and sound sensor systems of the apparatus aligned with the first image and sound tracks, the first half of the program can be shown. By then automatically reversing the direction of the film strip, when the end of the strip is reached and simultaneously shifting the illumination, lens and sound sensor systems into alignment with the second image and sound tracks the second half of the program can be shown. The cycle is then automatically repeated and in this way the motion picture program can be run continuously.

It is another object of the present invention to provide an apparatus of the type previously described which is fully automatic and highly reliable so that once properly set up and started, it can be left alone and will require only periodic and limited operator surveillance.

It is another object of the invention to provide an apparatus of the class described in which there is provided an automatic safety shutdown system so that in the event of film breakage, all power to the apparatus will be instantly interrupted.

It is still another object of the invention to provide an apparatus of the aforementioned character in which the film feeding system and thee mechanisms for shifting the optical and sound sensing subsystems of the apparatus from the first to the second tracks are operatively coupled to a common drive system driven by a reversible electric motor and in which reversal of the film feed and shifting of the optical and sound sensing subsystems is accomplished by a sensing device which senses the passage of indicating points provided near each end of the film strip and thereupon automatically causes a reversal of the direction of rotation of the electric motor and the drive system.

It is another object of the invention to provide novel, foldable film reel support arms which house reel drive mechanism operated by the common drive system and so constructed and arranged as to drive one of the film reels while permitting the other to free wheel when the drive system is rotating in one direction and to reverse the process when the drive system is rotating in the opposite direction. In this way the film reels alternately act as film take-up and film feed reels, depending upon the direction of travel of the film strip.

It is a further object of the invention to provide a novel and unique intermittent film feed system in the form of a film feed claw mechanism which is driven by the common drive system and serves to move the film strip intermittently between the illumination and projection lens systems.

In summary, these and other objects of the invention are accomplished by a novel and unique data conversion device including data carrying means having at least two data tracks each carrying data susceptible of being transformed into perceptible form; data transforming means for acting upon the data carried by the data carrying means, said aforementioned means being movable relative to each other from a first position wherein the data carried by one track is acted upon by the data transforming means to a second position wherein the data carried by the second data track is acted upon the data transforming means; drive means for moving the data carrying means relative to the data transforming means alternately in a first direction along the data tracks and then in a reverse direction along the data tracks; and shifting means for moving the data carrying means and the data transforming means relative to each other from a first position to a second position upon reversal of the drive means.

BRIEF DESCRIPTION OF THE DRAWINGS

FIG. 2 is a fragmentary side elevational view of the first side apparatus showing manner in which the film feeds through the apparatus and illustrating the relative locations of the illumination, projection lens, sound sensor and film feed systems of the apparatus.

FIG. 6 is a cross-sectional view taken along lines 6—6 of FIG. 5 showing the arrangement of the light source, the condenser lens, the film guide and the projection lens subsystems of the apparatus.

FIG. 7 is a view similar to FIG. 5 but showing the mechanism for shifting the illumination system of the apparatus as it appears in a second or shifted position in alignment with the second image track on the film strip.

FIG. 8 is an enlarged cross-sectional view taken along lines 8—8 of FIG. 2 illustrating the construction of the intermittent feed or claw subsystem of the device for intermittently feeding the film between the illumination system and the projector lens of the apparatus.

FIG. 9 is a plan view taken along lines 9—9 of FIG. 8 further illustrating the construction of the intermittent film feed or claw subsystem and the manner in which it is operably coupled with the main drive system.

FIG. 10 is an enlarged cross-sectional view taken along lines 10—10 of FIG. 2 illustrating the construction of the mechanism for shifting the projector lens from a first position in alignment with one image track on the film to a second position in alignment with the other image track on the film.

FIG. 11 is an enlarged cross-sectional view taken along lines 11—11 of FIG. 10 showing the construction of the friction clutch arrangement of the mechanism for shifting the projector lens.

FIG. 12 is a fragmentary view of the lens shifting mechanism similar to FIG. 10 showing the projector lens shifted into a second position.

FIG. 15 is a cross-sectional view taken along lines 15—15 of FIG. 14 further illustrating the construction of the sound sensing system and showing the system in a first position in alignment with one of the sound tracks on the film.

FIG. 16 is a fragmentary view similar to FIG. 15 showing the sound sensing system shifted to a second position in alignment with the other sound track on the film. FIG. 17 is a side elevational view, partly broken away to show internal construction, of one of the two identically constructed film reel driving and support arms of the apparatus.

FIG. 18 is a greatly enlarged cross-sectional view taken along lines 18—18 of FIG. 17 further illustrating the construction of the film reel driving and support arm.

FIG. 19 is a view taken along lines 19—19 of FIG. 18 showing the construction of the film reel driving arm clutch subsystem which permits the reel to be driven in one direction and to free wheel in the other.

DESCRIPTION OF ONE EMBODIMENT OF THE INVENTION

Turning now to the drawings, the data conversion device of the present invention is shown in the form of a continuous motion picture projection apparatus. Referring particularly to FIGS. 1–4 of the drawings, the principal operating systems of the apparatus are generally identified by the capital letters A-H, with the film and film feed system generally designated by the letter A. The letter B identifies the illumination system which comprises a lamp housing containing a light source, a cooling system for cooling the lamp housing and a condenser lens system for focusing the light on the photographic images imprinted on the film. The projection lens system is indicated at C and the sound system at D. The electrical system E, including a power supply, an amplifier and the operating control panel, is carried by the base portion of the projector. The letter F designates the film sensing and reversal system of the apparatus for automatically reversing the direction of feed of the film upon the film reaching a predetermined point near the end of one film track.

Figure 3:
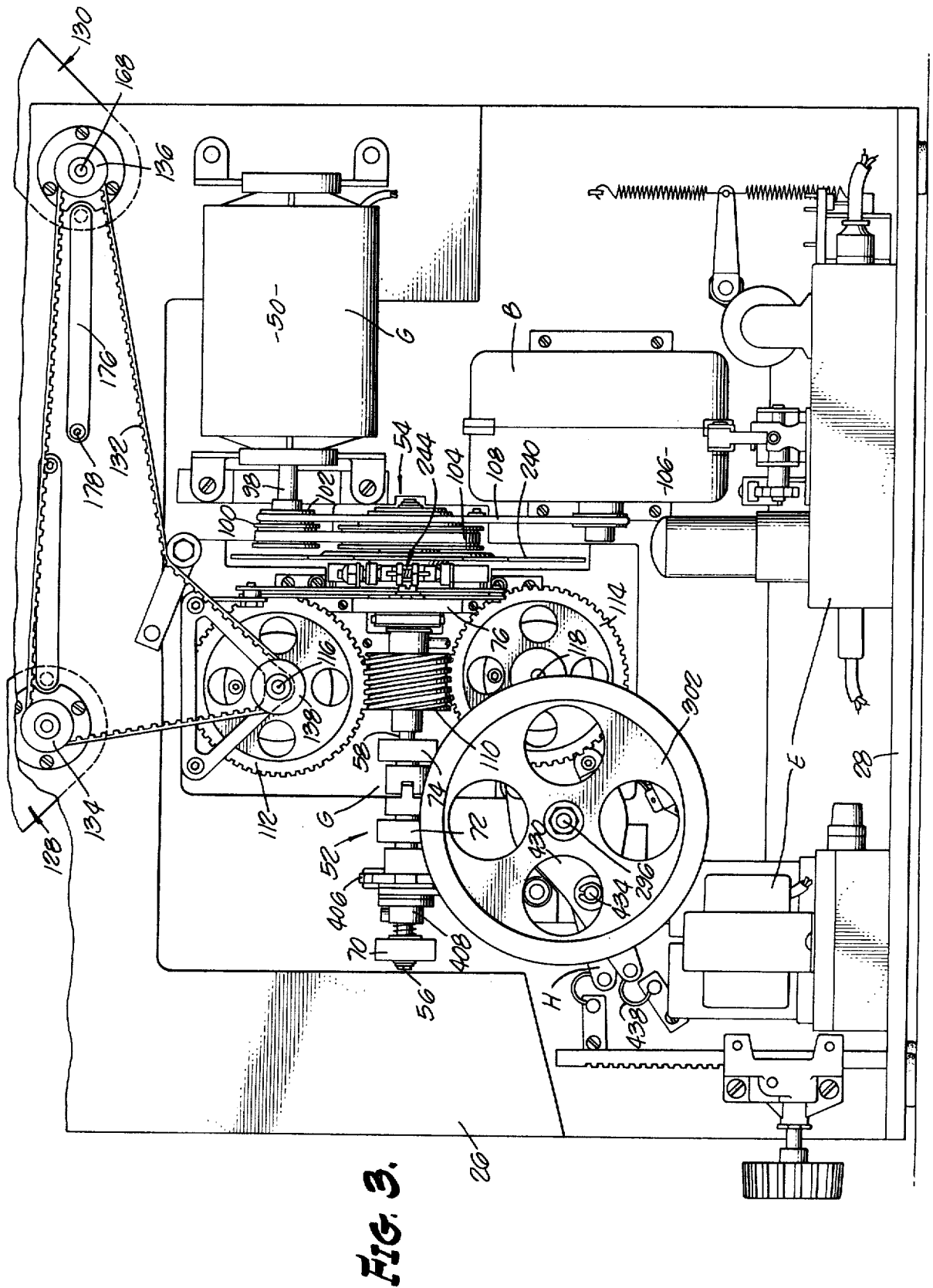
FIG. 3 is a fragmentary side elevational view of the opposite, or second, side of the apparatus illustrating the construction of the main power drive system and the location of certain of the electrical subsystems of the apparatus.
Figure 4:
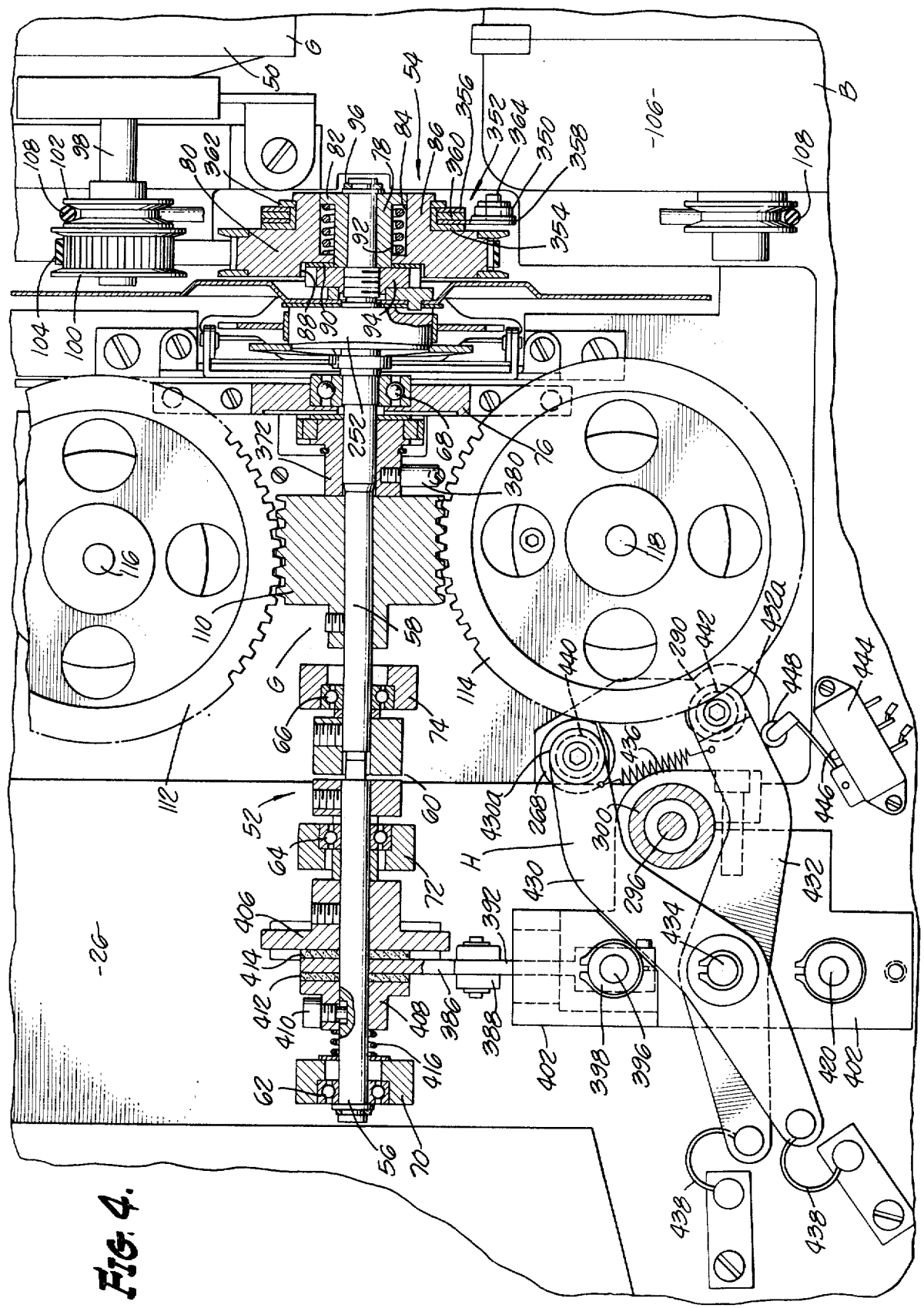
FIG. 4 is an enlarged fragmentary side elevational view of the apparatus similar to the view shown in FIG. 3 but showing more clearly the construction of the main power drive system. In this FIG., the flywheel shown in FIG. 3 is absent enabling clearer illustration of the construction of the safety stop system for stopping the projector in the event of film breakage.

Turning particularly to FIGS. 3 and 4, the power drive system, including a reversible motor and main drive shaft, is generally designated by the letter G. The safety stop mechanism for instantly stopping the operation of the apparatus in the event of film breakage is best seen in FIG. 4 and is identified by the letter H.

Figure 25:
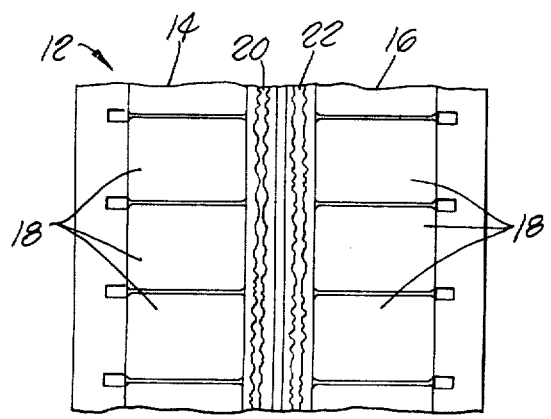
FIG. 25 is a fragmentary plan view of the data carrying means or film strip used in the apparatus illustrating one arrangement wherein the first and second sound tracks are disposed intermediate of the first and second image tracks.
Figure 26:
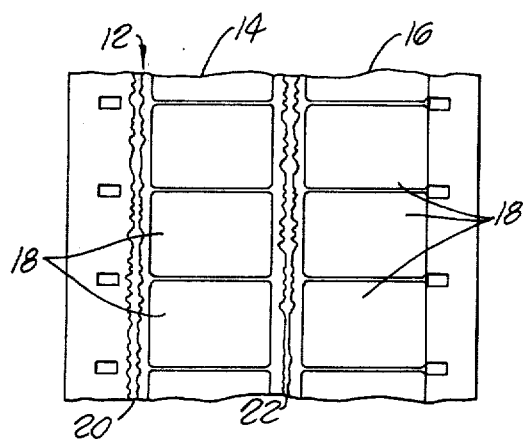
FIG. 26 is a fragmentary plan view of another form of film strip showing the first and second sound tracks disposed on opposite sides of the first image track.

Considering now the details of the construction of the apparatus, the data carrying means for carrying data susceptible of being transformed into perceptible form is provided in this embodiment of the invention in the form of an elongated strip of photographic film 12. As best seen in FIGS. 25 and 26, the film has imprinted thereon in a side by side relationship along substantially its entire length first and second image tracks 14 and 16, each track comprising a series of sequential photographic images 18. For reasons which will become apparent, the photographic images imprinted on one track are contact prints while those on the other track are optically printed and therefore are optically reversed from the images which are contact printed.

Also imprinted on the film, in a manner well known in the art, are first and second sound tracks 20 and 22 which carry audio data synchronized with the first and second image tracks. Data transforming means for acting upon the data carried by the data carrying means or film strip 12 and for transforming it into perceptible form (in this instance visual data in the form of pictures projected onto a screen and audio data in the form of audible sound) is provided in this embodiment of the invention in the form of the cooperatively associated illumination, projector lens and sound sensor systems previously identified. As will be discussed in greater detail hereinafter, each of these systems is movable relative to the film from a first position wherein the data carried by one set of data tracks, for example, image track 16 and sound track 22, is acted upon by the data transforming means, to a second position wherein the data carried by the other set of data tracks is acted upon by the data transforming means.

To move the data carrying means or film strip 12 past the data transforming means in a direction along the data tracks, there is provided a power drive means which is adapted to move the film first in one direction axially along the length of the film until the end of the data track is reached, and then in a reverse direction to the point of beginning. So that the apparatus can operate on a continuous basis, there is also provided means operably coupled with the drive means and the data transforming means for automatically moving the latter from a first position to a second position upon reversal of the direction of movement of the film strip. The details of construction of the drive means and the manner in which the data transforming systems are shifted from a first position in alignment with one data track on the film to a second position in alignment with the other data track on the film, will be described fully in the paragraphs which follow.

Figure 5:
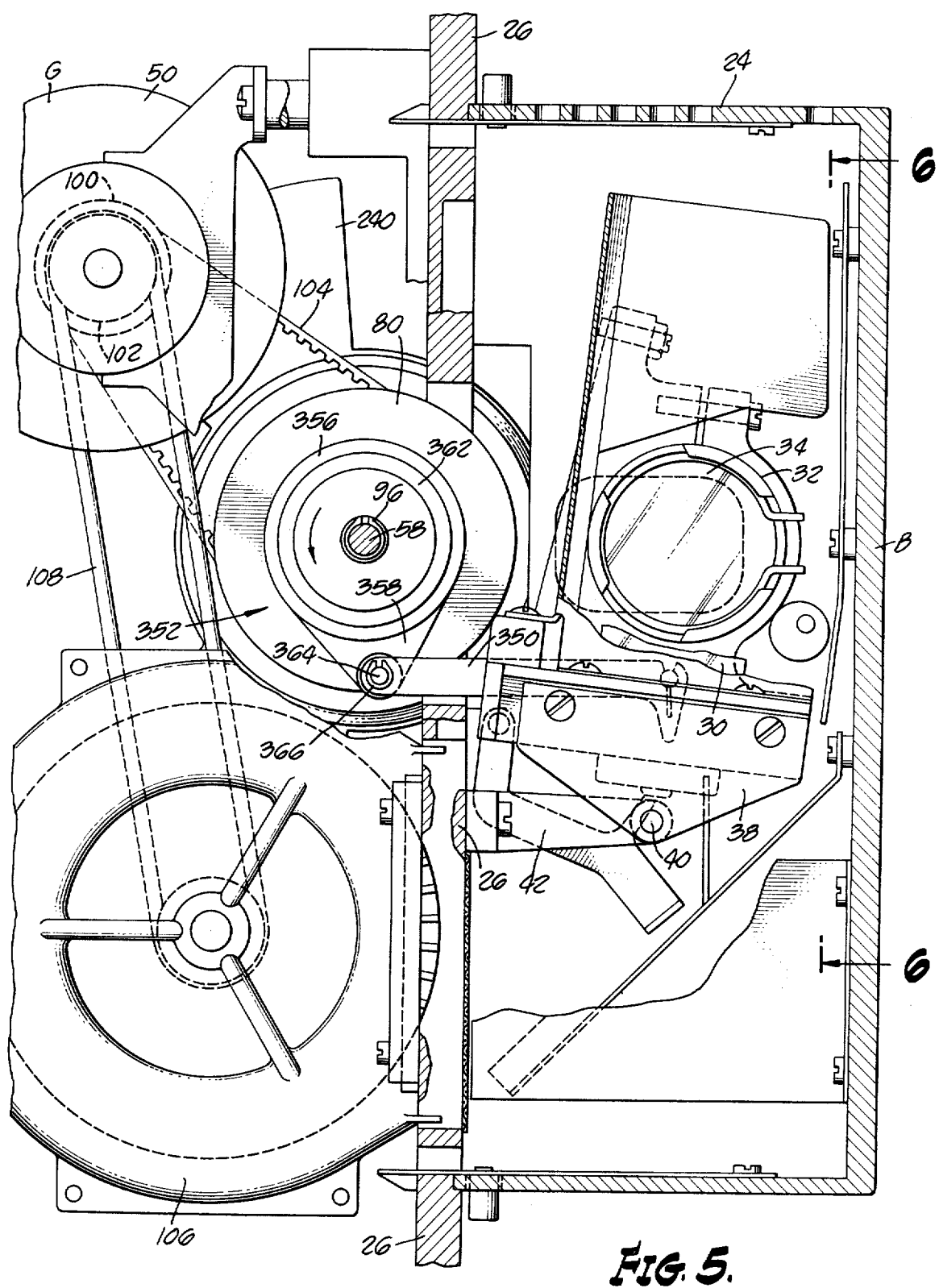
FIG. 5 is an enlarged cross-sectional view taken along lines 5—5 of FIG. 2 showing one position of the mechanism for shifting the illumination system of the apparatus from a first position in alignment with one image track on the film to a second position in alignment with the other image track on the film.

Referring to FIGS. 5 and 6, the illumination system of the apparatus can be seen to comprise a lamp housing 24 mounted on one side of a centrally disposed mounting partition or wall 26, which wall is integral with and extends upwardly from the base portion 28. Housed within lamp housing 24 and pivotally carried by partition 26 is the illumination means which, in this form of the invention, comprises a lamp, or light source 30, and a first optical means or condensor lens system 32, including first and second lenses 34 and 36 mounted in the configuration shown. The condensor lens system, which is of a type well known in the art, is so constructed and arranged as to receive rays of light from the light source and direct them through the photographic images 18 on the film. Both lamp 30 and lens system 32 are mounted on a supporting structure 38 which is pivotally connected by means of pins 40 to supporting arms 42 affixed to mounting wall 26. Electricity is supplied to lamp 30 by electrical wires 44. As will become clear from the description which follows, when the illumination means is in the position shown in FIG. 5, it is precisely aligned with one image track on the film and when it is moved to the position shown in FIG. 7, it is precisely aligned with the other image track.

The projection lens system, or projection means C (FIG. 6) is located on the opposite side of the film strip 12 from the illumination means and is disposed in axial alignment with the condensor lens system 32. Light rays are received by the projection lens or second optical means after they have passed through the film and are projected onto a screen. In this way the photographic images on the film are magnified so they can easily be seen by the audience. As can be observed by also referring to FIGS. 10 and 12, the projection means is pivotally carried by supporting wall 26 by means of a bracket 46 which protrudes outwardly from the wall, and pivot pin 48 which extends through apertures suitably formed in the bracket and in ears 49 of the projection means. Like the illumination means, the projection means is movable from a first position in alignment with one image track on the film to a second position in alignment with the other image track on the film.

Referring now to FIGS. 3 and 4, the drive means for moving the film along its length between the illumination means and the projection means can be seen to comprise a motor means shown here in the form of a reversible electric motor 50 which is drivably connected to a main power train 52 by means of a clutch mechanism 54. As will soon become apparent, the driving power required to operate the film reel arm systems, the film sprockets, the intermittent film feed or claw system, the rotating shutter and the various mechanisms for shifting the position of the data transforming means relative to the film is supplied by the motor driven main power train 52. As best seen in FIG. 4, power train 52 includes first and second drive shafts 56 and 58 coupled together by coupling 60 and is rotatably supported by bearings 62, 64, 66 and 68. Bearings 62, 64 and 66 are in turn supported respectively by bearing holders 70, 72 and 74 carried by supporting wall or partition 26. Bearing 68 is supported by a cross bracket 76 carried by and extending through partition 26.

Clutch mechanism 54 which is operably connected to second drive shaft 58 near its right end, as viewed in FIG. 4, comprises a cooperatively coupled clutch hub 78 rotatably mounted on shaft 58 and a clutch pulley 80. Hub 78 has a radially extending flange 82 at its right end which is closely received in a first counterbore 84 formed in pulley 80. Pulley 80 also has an axially extending flange 86 and a second counterbore 88 which is adapted to receive a fiber disc 90. A biasing means or spring 92 is disposed within counterbore 84 for urging clutch pulley 80 toward a slotted cam nut 94 threadably connected to drive shaft 58 and receivable within counterbore 88 forwardly or to the left of fiber disc 90. A retaining ring 96 serves to locate clutch hub 78 axially on shaft 58 in engagement with cam nut 94.

Provided on shaft 98 of motor 50 is a drive pulley assembly including first and second drive pulleys 100 and 102. Clutch pulley 80 is drivably connected to drive pulley 100 by a drive belt 104. Drive pulley 102 is connected to a cooling means or blower 106 by a drive belt 108. Blower 106 forms a part of the illumination system of the apparatus and serves to cool the light box which houses the projection lamp by continuously circulating air therethrough.

With the construction described in the preceding paragraphs, it will be appreciated that since clutch pulley 80 is normally urged by spring 92 into frictional engagement with disc 90 which, in turn, is urged into frictional engagement with cam nut 94, rotation of motor shaft 98 in a forward or reverse direction will result in belt 104 normally imparting a corresponding rotation to drive shaft 58. Impedance above a given level opposing rotation of shaft 58, however, will cause clutch pulley 84 to rotate relative to shaft 58 in slipping engagement with fiber disc 90 thus preventing damage to the drive system.

Affixed to shaft 58 at a location intermediate of bearings 66 and 68 is a worm gear 110 which is adapted to drivably engage mating first and second drive gears 112 and 114. As can be seen by also referring to FIG. 10, drive gears 112 and 114 are affixed to shafts 116 and 118 which are rotatably supported by suitable bearing assemblies 120 and 122 mounted on partition 26 at locations above and below shaft 58. Shafts 116 and 118, which form a part of the film drive system, rotatably drive upper and lower film sprockets 124 and 126 (FIGS. 2 and 10), each of which is provided with a multiplicity of outwardly extending fingers 127 adapted to be received in perforations formed along the edges of the film strip.

As illustrated in FIGS. 3 and 10, shaft 116 also drives the mechanisms of film reel support means 128 and 130 by means of a timing belt 132 which interconnects support arm pulleys 134 and 136. Timing belt 132 is driven by drive pulley 138 which is affixed to shaft 116 near its left end as viewed in FIG. 10.

Referring now to FIGS. 2, 3 and 17, the first and second film carrying reel means of this form of the invention can be seen to include reel support arms 128 and 130 which are pivotally mounted on supporting partition 26. The reel arms are pivotally mounted so that they may be moved alternately into a stowed position within the carrying case, as indicated by the phantom lines of FIG. 2, and into an extended position so as to rotatably carry film reels 140 and 142 during operation of the apparatus. As will become apparent from the description which follows, depending upon the direction of rotation of the drive train, the film reels serve alternately as film take-up and film feed reels.

In FIGS. 17 and 18, the film support arms, the operating mechanisms of which are of identical construction, are shown to comprise a body portion of channel-shaped housing 144 including a curved end section 146 at one end, an end closure plate 147 at the other end, and a cover plate 148. Housing 144 is connected to partition 26 in the following manner. As shown in FIG. 18, the flange portion 150 of an inner arm hub 152 is affixed by fasteners 154 to housing 144. The shank portion 156 of inner arm hub 152 is in turn rotatably supported by bearings 158 carried within the shank 160 of an outer arm hub 162. Outer arm hub 162 is affixed to supporting partition 26 by fasteners 164 which extend through an integral flange portion 166 provided intermediate of the ends of the shank 160.

The drive mechanisms of the reel support arms are driven by a support arm clutch shaft 168. Clutch shaft 168, to which previously identified drive pulley 136 is affixed at one end, extends through supporting wall 26 into housing 144 and is rotatably supported by inner and outer bearings 170 and 172 carried within shank portion 156 of inner arm hub 152. Affixed to the opposite end of shaft 168 is a clutch and gear assembly comprising a bevel gear 173 and an arm clutch means 174. With the construction thus described it will be apparent that the arm assembly can pivot relative to the support wall 26 from an operative to a stowed position about bearings 158. Additionally, when pulley 134 is driven by timing belt 132, shaft 168 can rotate within bearings 170 and 172 and, in a manner presently to be discussed, serves to drive bevel gear 173.

A lock mechanism which is provided to lock the reel support arms into an operative position is shown in FIGS. 17 and 18 as comprising a flat spring member 176 affixed at one end to partition 26 by a fastener 178.

Affixed at the opposite end of member 176 are locking pins 180 and 182 which are receivable into apertures formed in partition 26. Pin 180 is also removably receivable in an aperture 184 formed in the arm housing and is arranged so that when the arm is in an extended position, as shown in FIG. 17, spring member 176 will urge pin 180 into aperture 184, thereby locking the arm against pivotal movement.

Turning now to FIG. 19, the clutch portion 174 of the left arm clutch and gear assembly can be seen to comprise a housing 188 which is affixed to gear 173 and a cam 190 carried within the housing and connected to shaft 168. Cam 190 is provided with a plurality of flat portions 192 each terminating in a radially extending shoulder 194. Disposed within the space formed between housing 188 and flats 192 are rollers 196, each of which is adapted to rotate about an axis generally parallel to the axis of rotation of shaft 168. Biasing means shown here as springs 198 are carried between rollers 196 and shoulders 194 and serve to yieldably resist movement of the rollers toward the shoulders 194.

With the construction illustrated in FIG. 19, cam 190 rotates freely within housing 188 when shaft 168 rotates in one direction and by means of rollers 196, drives housing 188 when the shaft rotates in the opposite direction. More specifically, when the shaft rotates in a counterclockwise direction, the cam assembly rotates freely within the housing with the rollers 196 acting as roller bearings. However, when the shaft rotates in a clockwise direction, as indicated by the arrow of FIG. 19, the rollers will cam against the housing so as to drive it and gear 173 to which it is connected in a clockwise direction.

Referring to FIG. 18, gear 173 is drivably meshed with bevel gear 200 which is affixed to one end of shaft 202 by set screw 204. Affixed to the opposite end of shaft 202 by set screw 206 is a bevel gear 208 which, in turn, is adapted to drive bevel gear 210. Shaft 202 is rotatably supported within housing 144 by bearing systems 212 and 214. Associated with bearing system 214 is a braking arrangement 216 adapted to stop the rotation of the shaft when clutch 174 moves into a free wheeling mode. Bevel gear 210 is affixed to a shaft 218 which is rotatably carried by housing 144. Also affixed to shaft 218 is a pulley 220 which is interconnected to a reel arm pulley 221 of a reel support assembly 222 (FIG. 17) by means of a flat drive belt 224. As best seen in FIG. 17, the reel support assembly also includes a swivel arm 228 pivotally connected to housing 144, a reel shaft 230 to which pulley 221 is connected, and a combination ball bearing-spring reel locking mechanism 232 (FIG. 18) for holding the reel in place on the reel shaft. A biasing means in the form of a spring arrangement 234 (FIG. 18) is interposed between housing 144 and the swivel arm so as to bias the latter in a direction away from the housing so as to normally keep tension on flat belt 224. It is to be understood that the second reel arm of the apparatus is of similar construction to the reel arm just described and, therefore, is not shown in detail in the drawings, nor is it described in detail herein.

With the construction of the reel arm as shown in FIGS. 17-19, when shaft 168 is driven in a counterclockwise direction, as viewed in FIG. 19, clutch 174 will drive bevel gear 173 which will, in turn, drive shafts 202 and 218 and, in turn, reel shaft 230. Accordingly, the film reel affixed to shaft 230 will in this mode of operation act as a takeup spool and will rotate at the same speed as the driving spockets which are also driven by the main power train. When motor 50 is reversed causing the power train to reverse direction and shaft 168 to rotate in a clockwise direction, the clutch assembly 174 will free wheel permitting the reel to free wheel and serve as a feed spool.

Another major element of the drive means of the invention for moving the film between the illumination means and the projection means is the intermittent film drive means or film claw feeding mechanism, the details of which are illustrated in FIGS. 8 and 9. The function of the claw feeding mechanism is to receive the film from the feed sprockets and move it intermittently past the illumination means so that each succeeding image on the film is held for a short period of time in direct alignment with the rays of light from the condensor lens thereby permitting an unblurred image to be projected onto the screen by the projection lens.

As the claw mechanism moves each succeeding image into position for projection, the film gate is obscured by a three-blade rotary disc shutter affixed to shaft 58 and identified in the drawings by the numeral 240. The use of the rotary shutter to obscure movement of the film images is old in the art and forms no part of the present invention.

The intermittent film drive means of this form of the invention comprises a pair of vertically and horizontally movable shuttle arms 242 connected at one of their ends to a bearing support assembly 244 which is carried by a plate assembly 246 mounted on the previously identified cross bracket 76. Connected to the other ends of the shuttle arms is a claw 248 having spaced apart fingers 250 adapted to be received in the perforations in the film strip. Connected to drive shaft 58 is an up-down cam 252 operatively associated with the shuttle arms for moving them alternately up and down relative to the film as the shaft rotates and an in-out cam 254 for moving the shuttle arms in and out, or horizontally, as the shaft rotates. A wiper assembly comprising a wick 256, a wick support 258 and a spring 260 adapted to hold the wick against the up-down cam is provided to lubricate and clean the up-down cam. A follower 262 is carried by the shuttle arms for engagement with the in-out cam to move the shuttle arms and the claw alternately in and out relative to the film. A framer assembly indicated by the numeral 264 is provided to permit necessary adjustment of the claw feed mechanism. A pressure plate assembly generally designated by the numeral 265 holds the film in a planar orientation as it passes between the illumination means and projector lens.

With the construction shown in FIGS. 8 and 9, as shaft 58 is rotated by motor 50, the claw affixed to the shuttle arms will be caused to move alternately toward and away from the film with the fingers 250 moving into and out of the perforations in the film. The cam assemblies are arranged so that upon the fingers of the claw moving into engagement with the perforations in the film, the claw will be moved vertically relative to the film by the up-down cam, thereby causing the film to move a fixed distance relative to the illumination means. The in-out cam will then cause the fingers to move out of engagement with the perforations in the film and the claw will once more be moved vertically relative to the film by the up-down cam and returned to its starting point. By continuously repeating the cycle, the film is moved intermittently, image by image, past the illumination means.

The next major system of the apparatus of the invention which will be considered is the audio data sensing means which also forms a part of the data transforming means and serves to sense the audio data on the film and convert it into audible sound. As is most clearly seen in FIG. 2, the film, when moving in the direction of the arrow, travels under film roller 266, around drive sprocket 124, under film roller 267, through the intermittent feed system just described, around feed sprocket 126 and under a film roller 268, and then around a sound drum and shaft assembly 270. Referring to FIGS. 13–16, wherein the details of the construction of the audio data sensing means are shown, it can be seen that the major elements of this system include a photoelectric cell assembly 272 (FIG. 14), a sound optics assembly 274, and a second light source or exciter lamp 276. The electronic assemblies including a power supply and amplifier unit which support the audio data sensing means, are carried on the base portion of the apparatus, are of standard construction well known in the art, and are interconnected with the various elements of the audio data sensing means in a manner familiar to those skilled in the electronics art. The photoelectric cell assembly 272, the sound optics assembly 274 and the exciter lamp 276 are all mounted on a supporting plate or bracket 278 which, in turn, is slidably mounted on stud elements 280 and 282 (FIG. 15) which are connected to and protrude outwardly from supporting wall or partition 26. As will presently be discussed in greater detail, bracket 278 is operatively coupled with a third means for moving the audio data sensing means from a first position in alignment with one sound track on the film to a second position in alignment with the other sound track on the film.

It is to be understood that although in this form of the invention the sound data is imprinted onto the data carrying means by optical-electronic techniques, other sound recording methods such as, for example, magnetic tape recording, could be used. In the apparatus of the invention as shown in the drawings, when the audio data sensing means is aligned with one or the other of the sound tracks depending upon the direction of movement of the film strip, light of high intensity from the exciter lamp 276 is constrained by the sound optics system 274 which focuses it in a fine line across the sound track on the film as it passes around the sound drum assembly 270 and between aperture 284 FIG. 15) of the optics assembly and aperture 286 of the photoelectric cell assembly. The light received by the photoelectric cell produces a small electric current, the variations of which correspond to the modulated light which reaches the cell through the film. In this manner, there is provided an electrical current, the variations of which are identical with that which come from the microphone which was used on the set when the film was made and which made the sound track on the film. The current produced by the cell is carried by cables 288 to the amplifier unit for amplification in a manner well known in the art. The amplified current then drives the speaker 289 (FIG. 1) of the apparatus so that the sound can be heard by the audience.

Figure 14:
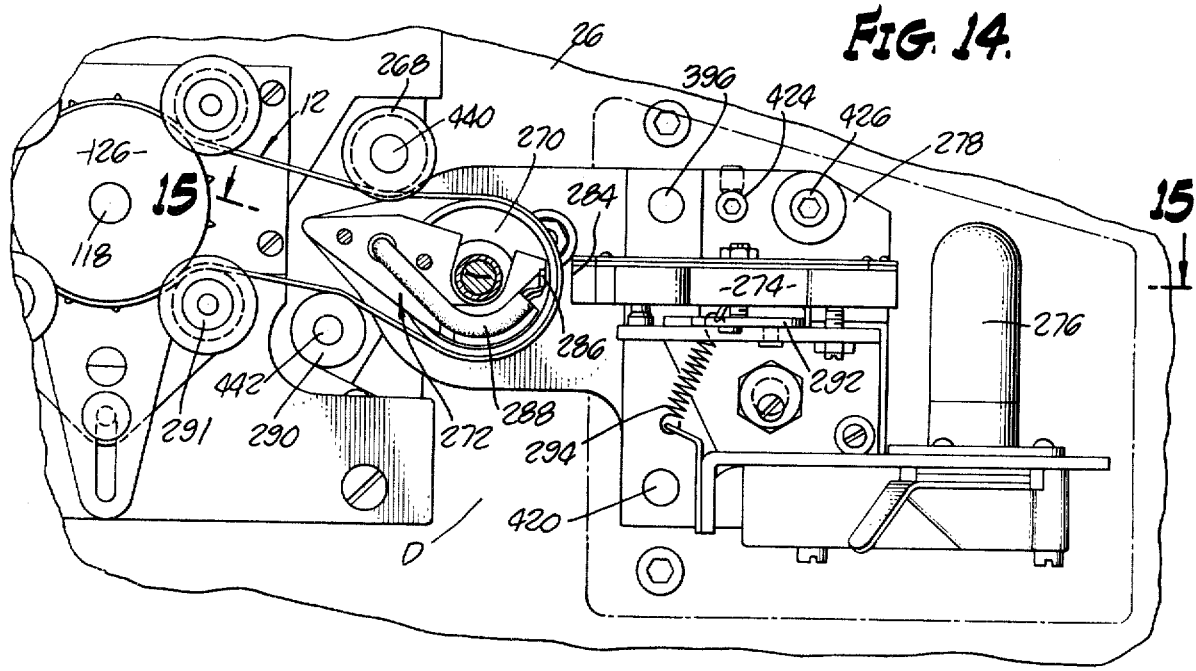
FIG. 14 is an enlarged side elevational view taken along lines 14—14 of FIG. 13 showing the details of the construction of the sound sensing system of the apparatus.

As indicated in FIG. 14, after the film passes around the sound drum assembly 270, it travels over a film roller 290, around another roller 291 and finally under drive sprocket 126. These elements of the apparatus comprise the means for moving the film past the audio data sensing means and with the construction shown, the film is held in close contact with the sound drum as it moves around the drum and between the sound optics and photocell assemblies. An adjustment means in the form of a cam arrangement 292, which includes spring 294, is provided to permit horizontal adjustment of the sound optics assembly 274 relative to the film.

Referring again to FIG. 15, the sound drum assembly 270 is rotatably supported on a shaft 296 which extends through supporting wall 26 and, in turn, is rotatably supported by bearings 298 carried by a bearing holder or sleeve 300 which also passes through and is connected to wall 26. A flywheel 302 is mounted on the end of shaft 296 opposite the end to which the sound drum is affixed to encourage free rotation of the drum as the film travels around it.

Figure 20:
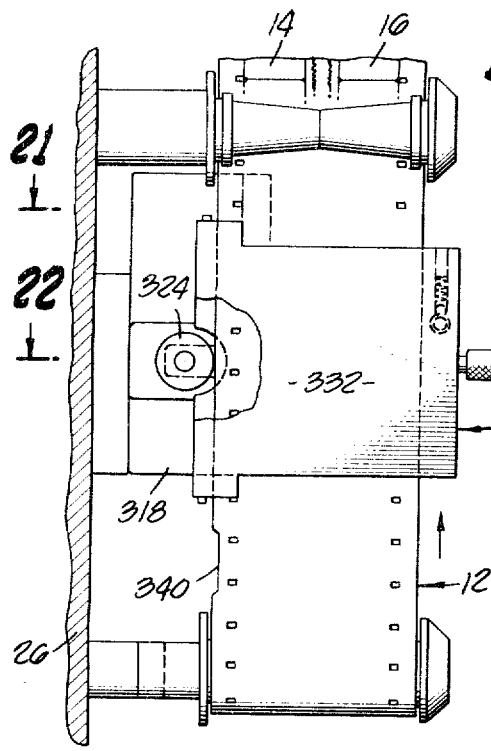
FIG. 20 is an enlarged cross-sectional view taken along lines 20—20 of FIG. 2 showing a first position of the film sensing and reversal mechanism of the apparatus for reversing the direction of travel of the film at a predetermined point.
Figure 22:
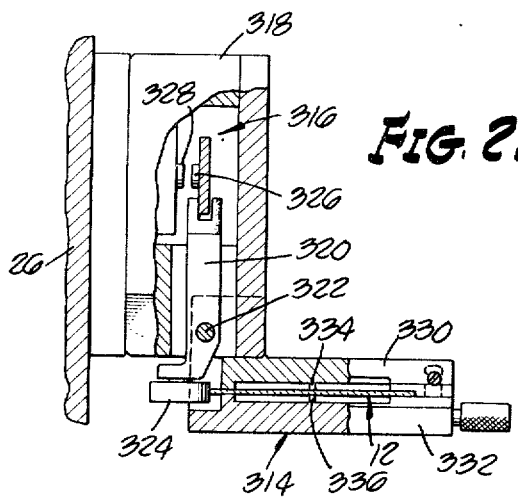
FIG. 22 is a plan view taken along lines 22—22 of FIG. 20 partly broken away to illustrate the electrical contact portion of the sensing mechanism as it appears in a first or open position.
Figure 21:
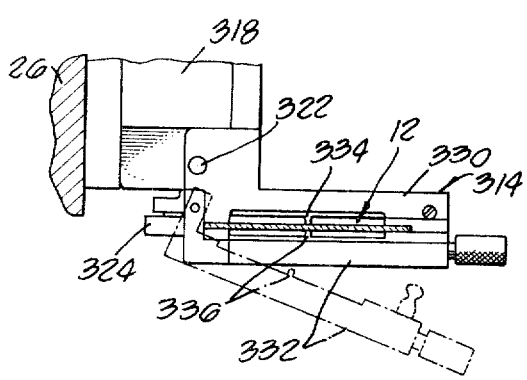
FIG. 21 is a plan view taken along lines 21—21 of FIG. 20 further illustrating the construction and operation of the film sensing and reversing mechanism. The phantom lines show the mechanism in an open position to enable initial threading of the film strip.

The next system of the apparatus which will be discussed is the reversing means F for sensing an indicating point on the film and thereupon reversing the drive means so as to reverse the direction of travel of the data carrying means or film strip. Referring to FIG. 2, the film strip, upon passing under drive sprocket 126, travels over film roller 306, under rollers 308, 310 and 312, and into the reversing means F. The details of the construction of the reversing means are shown in FIGS. 20 through 24. As best seen in FIGS. 20, 21 and 22, the reversing means of this form of the invention comprises a film guide subassembly 314 and a switching subassembly 316. The switching subassembly 316 is housed within a housing 318 which is affixed to supporting partition 26 and includes an arm 320 (FIG. 22) pivotally mounted on housing 318 so as to pivot about a pivot pin 322. Provided at one end of arm 320 is a sensor means in the form of a roller 324 adapted to rollably engage the edge of the film as the film passes through the guide subassembly 314. At the other end of arm 320 is a first electrical contact 326 adapted to move into engagement with a second electrical contact 328 carried by housing 318 upon pivotal movement of arm 320. Guide subassembly 314 comprises a base plate 330 affixed to housing 318 and a face plate 332 pivotally mounted on face plate 330 and adapted to swing into the position shown by the phantom lines in FIG. 21 to enable initial threading of the film. Provided intermediate the base plate and face plate are outwardly extending fingers 334 and 336 which, when the face plate is in a closed position, cooperate to guide the film strip through the guide subassembly and prevent it from warping out of plane.

Figure 23:
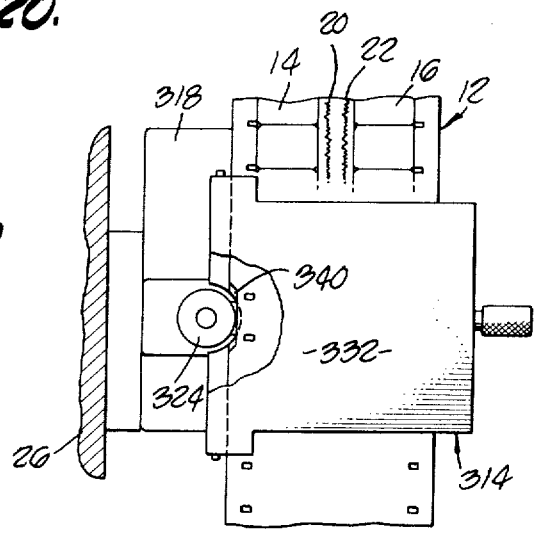
FIG. 23 is a view of the sensing mechanism similar to FIG. 20 but shown as it appears in a second position.
Figure 24:
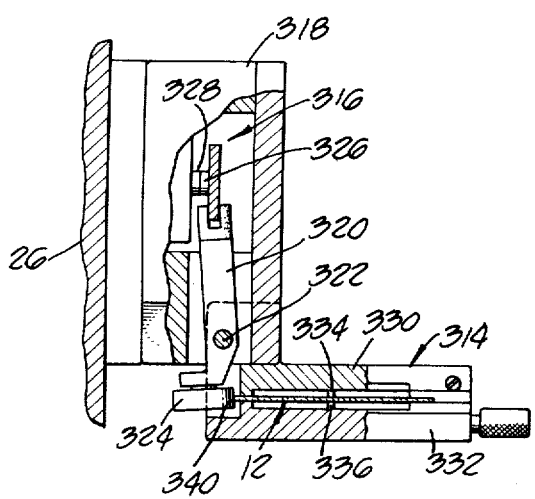
FIG. 24 is a view of the sensing mechanism similar to FIG. 22 but showing the electrical contact in a second or closed position.

The film strip is provided with notched out portions 340 near both extremities, which notches in this form of the invention comprise the indicating points sensed by the reversing means. As illustrated in FIGS. 23 and 24, when the film strip near its end point roller 324 will drop into the notched out portion 340 causing arm 320 to pivot about point 322. This will move contact 326 into engagement with contact 328 so as to energize a circuit (not shown, but of a type well known in the art), which will cause reversal of the direction of rotation of motor 50. Reversal of motor 50 will reverse the direction of travel of the film strip and, in a manner to be described in the immediately following section entitled "Operation", will activate the first, second and third means of the invention moving the illumination, projection and sound sensing systems respectively into alignment with the second optical and sound tracks on the film.

Operation

Figure 1:
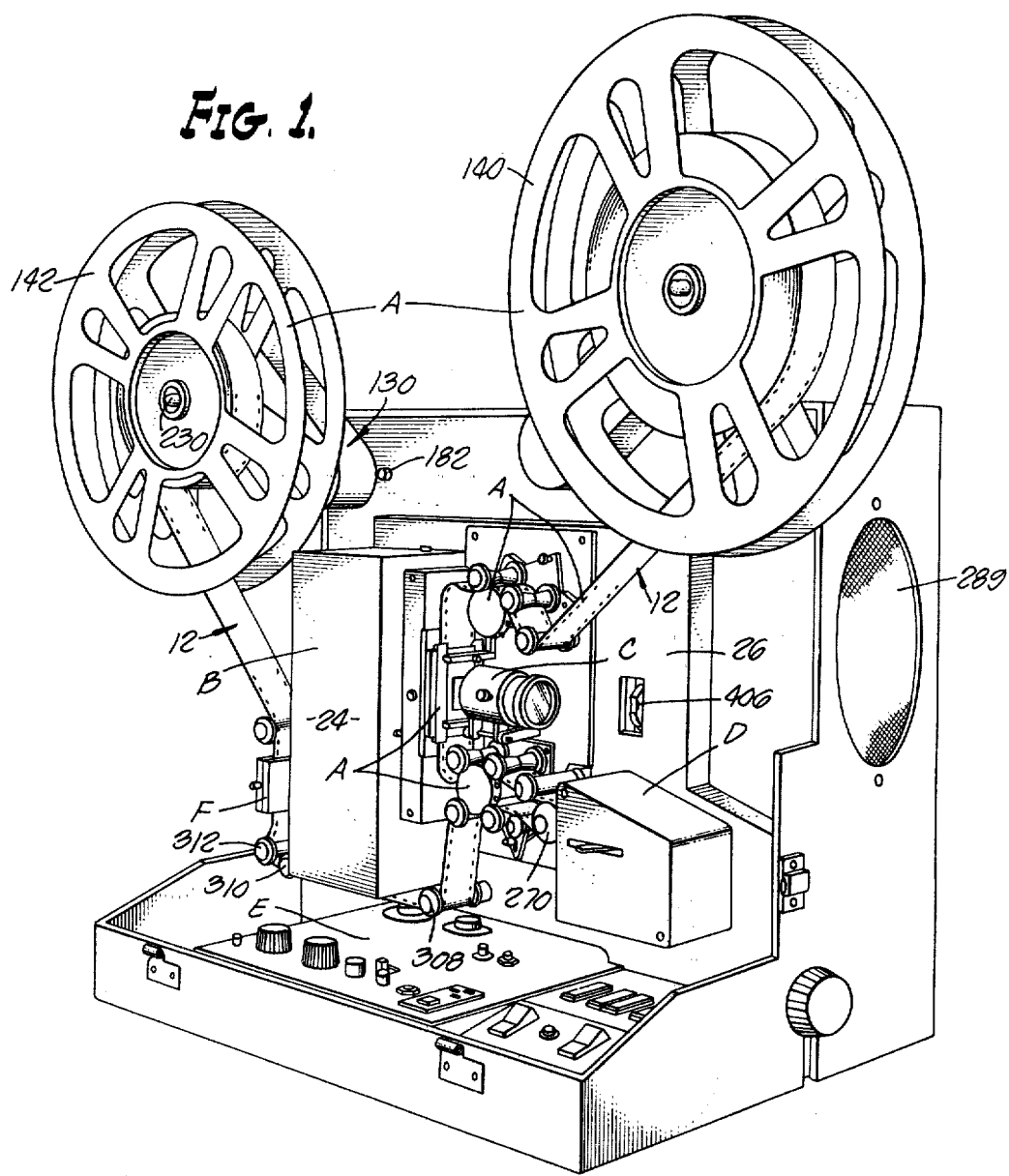
FIG. 1 is a perspective view of the continuous motion picture projection apparatus of the invention.

With the reel arms in an extended and locked position, the film threaded through the film rollers and drive sprockets in the manner illustrated in FIGS. 1 and 2, and with the device connected to a source of electrical power, operation of the power-on switch will energize the electric motor 50 and the various supporting electronic systems E.

Referring also to FIGS. 3 and 4, it can be seen that rotation of motor shaft 98 of the motor 50, in a clockwise direction when looking toward the right, will drive clutch mechanism 54, shaft 58, and worm gear 110 in a clockwise direction. Worm gear 110 will, in turn, drive gear 112, shaft 116 and pulley 138 in a clockwise direction. Since sprocket 124 (FIG. 2) is connected to shaft 116, it will be driven in a counterclockwise direction as viewed in FIG. 2 causing the film to travel in the direction of the arrow of FIG. 2.

By means of timing belt 132, pulley 138 (FIG. 3) will drive pulleys 134 and 136 in a clockwise direction as viewed in FIG. 3 at the same rate of speed as sprocket 124. As illustrated in FIGS. 17, 18 and 19, this rotation of sprocket 136 will cause shaft 168 and the clutch assembly of the left support arm 174 to rotate in the direction of the arrow of FIG. 19 and as previously explained to drive gear 173 which, in turn, will drive the gear train operating reel shaft 230. This, of course, will cause reel 142 to rotate at the same rate of speed as sprocket 124 and in this mode of operation function as a take-up spool to receive and wind up the film after it has traveled through the various systems of the apparatus. As previously explained, reverse rotation of pulley 136 of support arm 130 will cause the clutch assembly of this arm to free wheel permitting reel 142 to function as a film supply reel.

Turning again to FIG. 2, as the film passes over upper drive sprocket 124, it will be fed into the intermittent film feed means of the device where each frame or image will successively be positioned by the claw mechanism between and in alignment with the illumination means B and the projection lens C. As best seen in FIG. 10, in this mode of operation, the illumination means and the projection lens are aligned with the second or outside film track 16 upon which the first half of the program is carried. If the first half of the program were printed on the inside track 14, of course, the illumination means and the projection lens would be initially aligned with this track. It should also be observed at this point that in order to ensure that there is always sufficient slack in the film, because the sprockets 124 and 126 operate continuously, whereas the claw mechanism operates intermittently, a loop is formed in the film at both sides of the claw feed mechanism.

By referring now to FIGS. 8 and 9, it can be seen that as shaft 58 rotates, the egg-shaped up-down cam 252 connected thereto will engage the shuttle arms at follower portion 253 (FIG. 8) causing the claw 248 to move alternately up and down. Simultaneously, in-out cam 254, which is also connected to shaft 58, will engage follower 262 and because of the shape of the cam will cause the claw to move alternately in and out or toward and away from the films so as to move fingers 250 (FIG. 9) alternately into and out of the perforations formed at the edges of the film. As previously mentioned, shutter 240, also connected to shaft 58 at a location intermediate of clutch mechanism 54 and cam 252, is adapted to obscure the film gate during the time when the film is being moved by the claw mechanism.

After each image on the outside film track 16 is projected onto the screen, the film travels over lower drive sprocket 126 which is driven by shaft 118 (FIG. 3), under roller 268 and around sound drum assembly 270 (FIG. 2). When the film is traveling in this direction, the audio data sensing means, as shown in FIG. 15, is also aligned with the outside audio track 22 and is sensing sound data synchronized with the photographic images at that instant being projected onto the screen.

The film, after passing around the sound drum, is urged to the left (FIG. 2) by drive sprocket 126, passes over roller 306, under rollers 308, 310 and 312, and into the film guide assembly 314 of reversing means F. Due to the urging of reel 142, which in this mode of operation is functioning as a take-up reel, the film will move through the reversing means and be wound onto reel 142.

Turning now to FIGS. 20-24, when the notched out portion 340 of the film strip 12 reaches the position shown in FIGS. 23 and 24, roller 324 will drop into the notch causing contacts 326 and 328 to close. This will energize a circuit of standard design adapted to reverse the direction of rotation of motor 50. It is to be understood that a brief time delay is designed into the circuit to permit the notch to overrun the roller and then pass by it once more as the direction of film travel is reversed. In this way an immediate reversing of the motor is avoided.

Referring again to FIGS. 3 and 4, reversal of the motor 50 causes shaft 58 to now be rotated in a counterclockwise direction as viewed looking to the right in these figures. As will become apparent from the paragraphs which follow, this reversal of the direction of rotation of shaft 58 results in the automatic shifting of the illumination means, the projection lens and the sound data sensing means into a second position in alignment with the first or inside data tracks on the film strip upon which the second half of the program is carried.

Considering now the first means or first friction clutch of the invention for moving the illumination means into its second position, it can be seen by referring to FIGS. 4 and 5 that the illumination means, including the lamp and the first optical means or condenser lens 32 (FIG. 5) are mounted on a supporting structure or platform 38 which is pivotally carried by supporting arms 42 affixed to and extending outwardly from supporting wall 26. A link element 350 interconnects structure 38 with a lamp clutch mechanism 352 which, as best seen in FIG. 4, is carried by pulley 80 of the main drive clutch assembly. The lamp clutch mechanism comprises a split felt ring 354 (FIG. 4), a driver disc or lamp clutch ring 356, and a driven disc or lamp clutch 358, all carried by drive clutch pulley 80. A second felt ring or friction disc 360 is disposed between the driver disc and the driven disc and the entire lamp clutch mechanism is held in place on the drive clutch pulley 80 by means of a locating ring 362. Referring to FIG. 5, it can be seen that link element 350 is pivotally connected to the driven disc or lamp clutch 358 by a pin 364 which is held in position by a split locking ring 366. With shaft 58 rotating in the direction of the arrow of FIG. 5, the driven disc 358, due to its frictional engagement with the felt rings, will move into the position shown with the illumination means pivoted outwardly into alignment with the outside film track. As illustrated in FIG. 7, however, when the direction of rotation of shaft 58 is reversed to a clockwise rotation, as indicated by the arrow, driven disc 358 will be moved in a clockwise direction by the frictional urging of the felt rings. This will cause link 350 to pivot the illumination means about pivot pin 40 inwardly toward wall 26 and into the position shown in alignment with the first or inside film track.

Upon further reversal of the motor by the reversal means after the film has passed the apparatus in the reverse direction, the first means, or first friction clutch assembly, as just described would, of course, move the illumination means back to the starting position shown in FIG. 5.

One form of the second means of the invention, or second friction clutch, for moving the projection means C to its second position upon reversal of the direction of travel of the film is illustrated in FIGS. 10–12. In FIG. 10, the projection lens is shown in the first position in alignment with the outside or second image track 16 on the film 12. The second means can be seen to comprise a connecting bracket 370, extending through partition 26 at a location intermediate worm gear 58 and cross bracket 76 (FIG. 4) connected at one end to the projection lens and operatively coupled at its other end to drive shaft 58. Referring also to FIG. 11, the second means can be seen to also include a clutch member 372 rotatably carried by shaft 58 and connected to bracket 370, a clutch shoe 374 carried by clutch member 372 and movable into frictional engagement with shaft 58 and a biasing means or spring 376 for urging the clutch shoe normally into frictional engagement with shaft 58. Due to the eccentric mounting of clutch member 372 on shaft 58, when the shaft is rotating in the direction indicated by the arrow of FIG. 11, frictional drag by the clutch shoe will urge bracket 370 to the right causing the projection means to pivot about pivot pin 48. Full throw of the bracket 370, resulting in stop pin 380 which is threadably connected to clutch member 372 engaging stud 382 which is threadably affixed to and projecting outwardly from partition 26, will position the lens in exact axial alignment with image track 16 on the film. Upon reversal of the direction of rotation of shaft 58, frictional drag on the clutch shoe 374 will cause the connecting bracket 370 to move to the left and the projection means to pivot about pivot pin 48 into the position shown in FIG. 12. Full throw in this direction so that stop pin 380 engages stud 384 axially aligns the projection means with the inside or first image track 14. Studs 382 and 384 being threadably connected to partition 26 permit adjustment to the throw of the clutch assembly if required to precisely align the projection means with the image tracks on the film.

Figure 13:
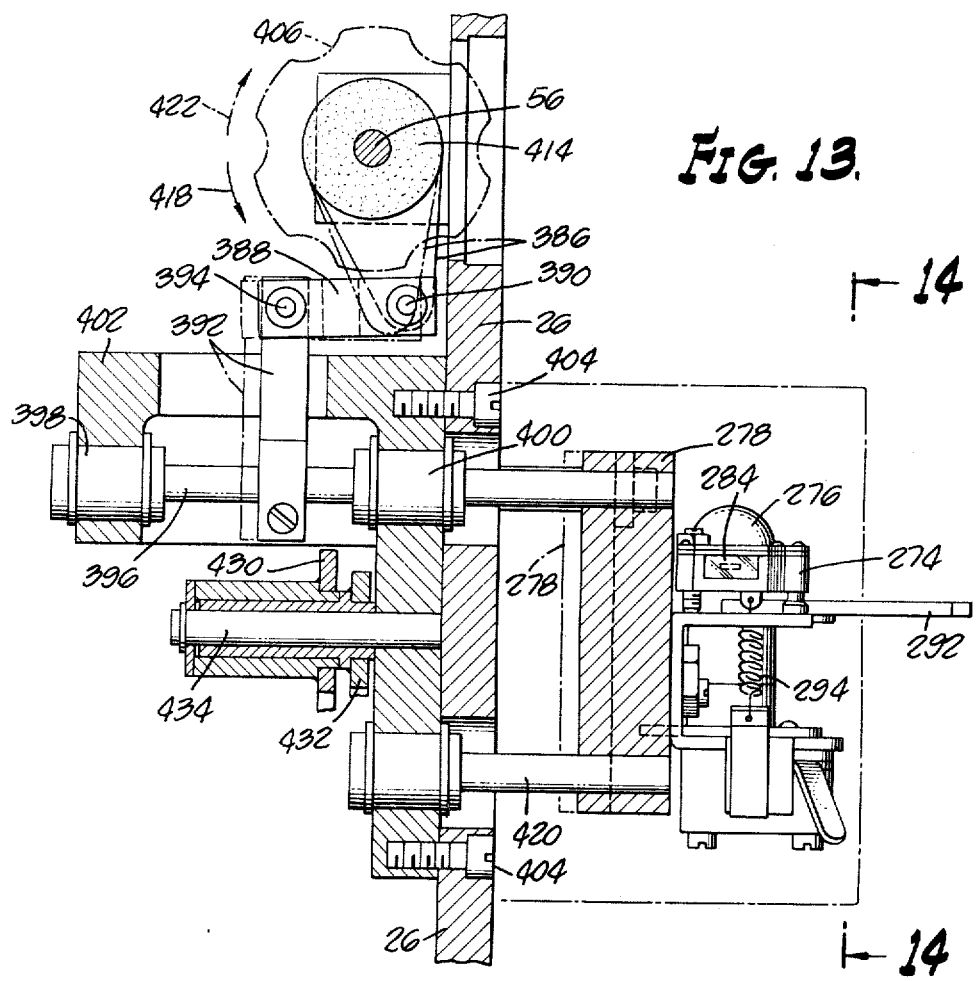
FIG. 13 is an enlarged cross-sectional view taken along lines 13—13 of FIG. 2 illustrating the construction of the mechanism for shifting the audio data or sound sensing system of the apparatus from a first position in alignment with one sound track on the film to a second position in alignment with the other sound track on the film.

In the embodiment illustrated in the drawings, the third means of the invention for shifting the audio data sensing means to a second position upon reversal of the direction of travel of the film is shown in FIGS. 13–16. Referring first to FIG. 13, the third means can be seen to comprise a sound system friction clutch means which includes a clutch member 386 rotatably carried by first drive shaft 56, a first link 388 pivotally connected to clutch member 386 by pivot pin 390 and a second link or drive block 392 pivotally connected at one end to the first link by pivot pin 394. Drive block 392 is connected at its other end to a shaft 396 slidably carried by bushings 398 and 400, both of which are supported by a rear bracket 402 connected to supporting partition 26 by threaded connectors 404. Shaft 396 is connected at its right end (FIG. 13) to supporting plate 278 which carries the audio data sensing means.

Turning now to FIG. 4, the sound system friction clutch means can be seen to also include a clutch wheel 406 connected on one side of clutch member 386 to shaft 56 for rotation therewith, a clutch slide disc 408 connected on the other side of member 386 to shaft 56 by a screw key 410 and first and second felt rings 412 and 414 interposed respectively between the clutch slide disc and member 386 and between the latter member and clutch wheel 406. Slide disc 408 is movable axially of shaft 56 and a biasing means or spring 416 is disposed between bearing holder 70 and slide disc 408 to urge the latter normally into engagement with felt ring 412. With this construction, due to the frictional drag of the felt rings, rotation of shaft 56 in the direction of arrow 418 of FIG. 13 will urge clutch member 386 to the right as shown by the solid lines. This, in turn, through links 388 and 392, will urge shaft 396 to the right moving supporting plate 278 slidably along stud elements 280 and 282 into the position shown in FIG. 15. In this position the sound optics assembly 214 and the photocell assembly 272 are in alignment with the outside sound track 22. A lower guide stud 420 (FIG. 13) slidably supports plate 278 so as to preclude cocking of the assembly during movement from one position to the other.

Upon reversal of the direction of rotation of shaft 56 to a clockwise rotation as indicated by arrow 422, frictional drag of the felt rings will cause clutch member 386 to swing to the left as indicated by the phantom lines of FIG. 13. This, in turn, through links 388 and 392, will urge shaft 396 to the left moving supporting plate 278 into the position shown in FIG. 16. This will align the sound optics and photocell assemblies with the inside sound track 20. As shown in FIGS. 15 and 16, one end of a stud 424, which is threadably carried by plate 278, limits the extent of travel of the supporting plate toward partition 26 and, along with a stop nut 426, which is threadably connected to stud 282 and which limits the extent of travel of the plate away from partition 26, provides a means for adjusting the travel of the sound assembly relative to the film strip.

In summary, with the construction of the apparatus as described, the data carrying means, or film strip, is first moved through the apparatus with the illumination means, the projection lens system and the sound sensor means aligned with the image and sound tracks carrying the first half of the program. In this operational mode the forward reel 140 (FIG. 1) is acting as a supply reel and the rearward reel 142 is acting as a take-up reel. When the film strip nears the end of the first half of the program, the reversing means will sense the notched out portion in the film and will cause the motor means to reverse its direction of rotation. This, of course, will reverse the direction of rotation of the main drive train and the drive sprockets thereby reversing the direction of travel of the film. In the reverse mode of operation, due to the construction of the support arm clutch mechanisms as previously described, the forward reel 140 will now act as the take-up reel and the rearward reel 142, the supply reel. Also, upon reversal of the direction of rotation of the drive shafts of the main drive train, the first, second and third means or shifting mechanisms of the invention will simultaneously move the illumination means, the projection lens system and the sound sensor means respectively into alignment with the second image and sound tracks so that the second half of the program which is carried thereon can be presented. The film strip will continue to travel in the reverse direction until the second notched out portion of the film strip which is located near the starting point of the program reaches the reversal means. Upon sensing the second notched out portion, the reversal means will once more reverse the motor means, the drive train and the drive sprockets causing the film strip to again travel in the first direction. As the direction of rotation of the drive shafts of the drive train is reversed, the first, second and third means of the invention will return the illumination means, the projection lens system and the sound sensor means to their starting position in alignment with the first image and sound tracks. The process will then be repeated automatically and continuously until the power is turned off.

Should the film strip break there is provided as a part of the apparatus of the invention a stop means for immediately and automatically interrupting the power circuit and stopping the motor means. In this embodiment of the invention the stop means H is provided in the form of the spring loaded, scissor arm mechanism and cooperating micro-switch arrangement illustrated in FIGS. 4 and 13. As best seen in FIG. 4, the stop means comprises first and second members 430 and 432 pivotally interconnected intermediate their ends by a shaft 434 which is carried by supporting bracket 402. A biasing means for normally urging ends 430a and 432a of members 430 and 432 toward one another is provided here in the form of springs 436 and 438. As best seen in FIGS. 4 and 14, the previously identified film rollers 268 and 290 which guide the film around sound drum assembly 270 are rotatably carried by shafts 440 and 442 which are in turn affixed to ends 430a and 432a respectively of the pivotally connected members. As best seen in FIG. 14, rollers 268 and 290 are normally urged apart by the film strip 12 as it travels around the sound drum. Turning again to FIG. 4, there is mounted on partition 26 proximate arm 432, a switch means shown here in the form of a normally closed micro-switch 444 which is operatively interconnected with the main electrical power circuit of the apparatus, and, when opened, is adapted to stop the flow of electricity to the device. A spring loaded switch arm 446 carrying a roller 448 disposed in engagement with member 432 near end 432a opens the switch upon movement of the ends of members 430 and 432 toward each other. With this construction, should the film strip break, rollers 268 and 290, which are normally held apart by the film strip, would move toward one another due to the urging of the biasing means. This movement would open switch 444 instantaneously stopping the flow of electricity to the apparatus.

Although an exemplary embodiment of the invention has been disclosed for purposes of illustration, it will be understood that various changes, modifications and substitutions may be incorporated in such embodiment without departing from the spirit of the invention as defined by the claims hereinafter appearing.

I claim:

1. A continuous motion picture projection apparatus comprising:
  a. an elongated film strip having imprinted thereon first and second image tracks, each comprising a series of sequential photographic images;
  b. a supporting structure having a base portion and a central mounting partition;
  c. illumination means pivotally mounted on said mounting partition on one side of said film strip and movable from a first position to a second position, including a lamp and a cooperating condensor lens so constructed and arranged as to direct rays of light through the photographic images of said first image track when said illumination means is in its first position and through said second image track when said illumination means is in its second position;
  d. a projection lens pivotally mounted on said partition on the other side of said film strip and movable from a first position of coaxial alignment with said condensor lens in its first position to a second position of coaxial alignment with said condensor lens in its second position;
  e. drive means carried by said supporting structure for moving said film in a first and second direction between said condensor lens and said projection lens so that the light passing through said condensor lens will pass through the images imprinted on said film, said drive means comprising:
    1. a rotatable drive shaft;
    2. reversible motor means for rotatably driving said drive shaft; and
    3. film feed means operably coupled with said drive shaft and adapted to engage said film to move it between said condensor lens and said projection lens;
  f. a first friction clutch means carried by said drive shaft for moving said illumination means alternately from its first position to its second position upon change of direction of rotation of said drive shaft said first friction clutch means comprising:
    1. a driven disc carried by said drive shaft and rotatable relative thereto;
    2. a link element pivotally connected at one end to said driven disc and connected at its other end to said illumination means;
    3. a driver disc carried by said drive shaft and rotatable therewith; and
    4. a friction disc interposed between said driver and driven discs to transmit rotational forces to said driven disc upon the change of direction of rotation of said drive shaft;
  g. a second friction clutch means carried by said drive shaft for moving said projection lens from its first position to its second position upon a change of direction of rotation of said drive shaft said second means comprising:
    1. a clutch member carried by said drive shaft and rotatable with respect thereto;
    2. a clutch shoe carried by said clutch member and movable radially into frictional engagement with said drive shaft whereby to impart rotational movement to said clutch member;
    3. biasing means carried by said clutch member for normally urging said clutch shoe into frictional engagement with said shaft; and
    4. a connecting bracket affixed at one end to said clutch member and at its other end to said projection lens; and
  h. a reversing means operatively associated with said motor means and said film strip for sensing an indicating point on said film and thereupon reversing the direction of rotation of said motor means.

2. The apparatus as defined in claim 1 in which said indicating point comprises a notched out portion provided near both ends of said film strip and in which said reversing means includes sensor means for sensing the notched out portions on the film and thereupon activating a circuit means operably coupled with and adapted to reverse the direction of rotation of said motor means whereby the apparatus will operate continuously to repeatedly project the film program.

3. The apparatus as defined in claim 1 including stop means operably associated with said motor means and said film strip for stopping said motor means in the event the film strip should break.

4. A continuous motion picture projection apparatus comprising:
   a. an elongated strip of film having imprinted thereon in a side by side relationship along substantially its entire length first and second image tracks each comprising a series of sequential photographic images;
   b. illumination means disposed on one side of said strip of film including a light source and first optical means for receiving rays of light from said light source and passing them through the photographic images on the film, said illumination means being movable relative to said film from a first position in alignment with said first image track to a second position in alignment with said second image track;
   c. projection means disposed on the opposite side of said film strip for receiving the rays of light passing through the film and projecting them onto a screen, said projection means being movable relative to said film from a first position in alignment with said first image track to a second position in alignment with said second image track;
   d. drive means for moving said strip of film between said first optical means and said projection means in a first direction and then in a second direction said driving means comprising:
      1. a rotatable drive shaft;
      2. reversible motor means for rotatably driving said drive shaft;
      3. film feed means operably coupled with said drive shaft and adapted to engage said film to move it between said first optical means and said projection means; and
      4. first and second film carrying reel means driven by said drive shaft for alternately reeling in and reeling out said strip of film relative to said film feed means;
   e. reversing means operatively associated with said drive means and said film strip for sensing an indicating point on said film and thereupon reversing said drive means to reverse the direction of travel of said film;
   f. first means operatively coupled with said drive means and said illumination means for moving said illumination means alternately between its first and second positions upon reversal of said drive means, said first means comprising a first friction clutch means operably coupled with said drive shaft and interconnecting said drive shaft with said illumination means for moving the latter alternately between the first and second positions upon a reversal of the direction of rotation of said shaft; and
   g. second means operatively coupled with said drive means and said projection means for moving said projection means alternately between its first and second positions upon reversal of said drive means, said second means comprising a second friction clutch means operably coupled with said drive shaft and interconnecting said drive shaft with said projection means for moving the latter alternately between the first and second positions upon a reversal of the direction of rotation of the shaft.

5. A continuous motion picture projection apparatus comprising:
   a. an elongated strip of film having imprinted thereon first and second image tracks each comprising a series of photographic images;
   b. illumination means for passing rays of light through said image tracks, said illumination means being movable relative to said film from a first position in alignment with said first image track to a second position in alignment with said second image track;
   c. projection means for receiving the rays of light passing through the film and projecting them onto a screen, said projection means being movable relative to said film from a first position in alignment with said first image track to a second position in alignment with said second image track;
   d. drive means for moving said strip of film between said illumination means and said projection means in a first direction and then in a second direction including a rotatable drive shaft and means for rotatably driving said drive shaft in a first and second direction;
   e. reversing means operatively associated with said drive means and said film strip for reversing said drive means to reverse the direction of travel of said film;
   f. first clutch means operably coupled with said drive shaft and interconnecting said drive shaft with said illumination means for moving the latter alternately between the first and second positions upon reversal of the direction of rotation of said shaft; and
   g. second clutch means operably coupled with said drive shaft and interconnecting said drive shaft with said projection means for moving the latter alternately between the first and second positions upon reversal of direction of rotation of the shaft.

6. The device as defined in claim 5 in which said strip of film has imprinted thereon first and second audio data tracks carrying audio data synchronized with said first and second image tracks respectively and said data transforming means comprising audio data sensing means for sensing the audio data on said film and converting it to audible sound, said sensing means being movable from a first position in alignment with said first audio track to a second position in alignment with said second audio track.

* * * * *